Dec. 26, 1961 B. OSTENDORF, JR., ET AL 3,014,982

STATION SELECTOR AND CONTROL APPARATUS

Filed Dec. 31, 1957 8 Sheets-Sheet 1

INVENTORS B. OSTENDORF, JR.
G. A. SELLERS, JR.
BY John E. Cassidy
ATTORNEY

Dec. 26, 1961 B. OSTENDORF, JR., ET AL 3,014,982

STATION SELECTOR AND CONTROL APPARATUS

Filed Dec. 31, 1957 8 Sheets-Sheet 2

INVENTORS B. OSTENDORF, JR.
G. A. SELLERS, JR.
BY
John E. Cassidy
ATTORNEY

STATION SELECTOR AND CONTROL APPARATUS

Filed Dec. 31, 1957 8 Sheets-Sheet 3

INVENTORS B. OSTENDORF, JR.
G. A. SELLERS, JR.
BY
John E. Cassidy
ATTORNEY

INVENTORS B. OSTENDORF, JR.
G. A. SELLERS, JR.
BY
John E. Cassidy
ATTORNEY

Dec. 26, 1961 B. OSTENDORF, JR., ET AL 3,014,982

STATION SELECTOR AND CONTROL APPARATUS

Filed Dec. 31, 1957 8 Sheets-Sheet 5

INVENTORS B. OSTENDORF, JR.
G. A. SELLERS, JR.
BY John E. Cassidy
ATTORNEY

Dec. 26, 1961 B. OSTENDORF, JR., ET AL 3,014,982

STATION SELECTOR AND CONTROL APPARATUS

Filed Dec. 31, 1957 8 Sheets-Sheet 6

INVENTORS B. OSTENDORF, JR.
G. A. SELLERS, JR.
BY
John E. Cassidy
ATTORNEY

Dec. 26, 1961 B. OSTENDORF, JR., ET AL 3,014,982

STATION SELECTOR AND CONTROL APPARATUS

Filed Dec. 31, 1957 8 Sheets-Sheet 7

INVENTORS B. OSTENDORF, JR.
G. A. SELLERS, JR.
BY John E. Cassidy
ATTORNEY

INVENTORS B. OSTENDORF JR.
G. A. SELLERS, JR.
BY John E. Cassidy
ATTORNEY 3,014,982
Patented Dec. 26, 1961

3,014,982

STATION SELECTOR AND CONTROL APPARATUS

Bernard Ostendorf, Jr., Stamford, Conn., and Gabe A. Sellers, Jr., Summit, N.J., assignors to Bell Telephone Laboratories, Incorporated, New York, N.Y., a corporation of New York Filed Dec. 31, 1957, Ser. No. 706,499
11 Claims. (Cl. 178—2)

Figures 1, 8:
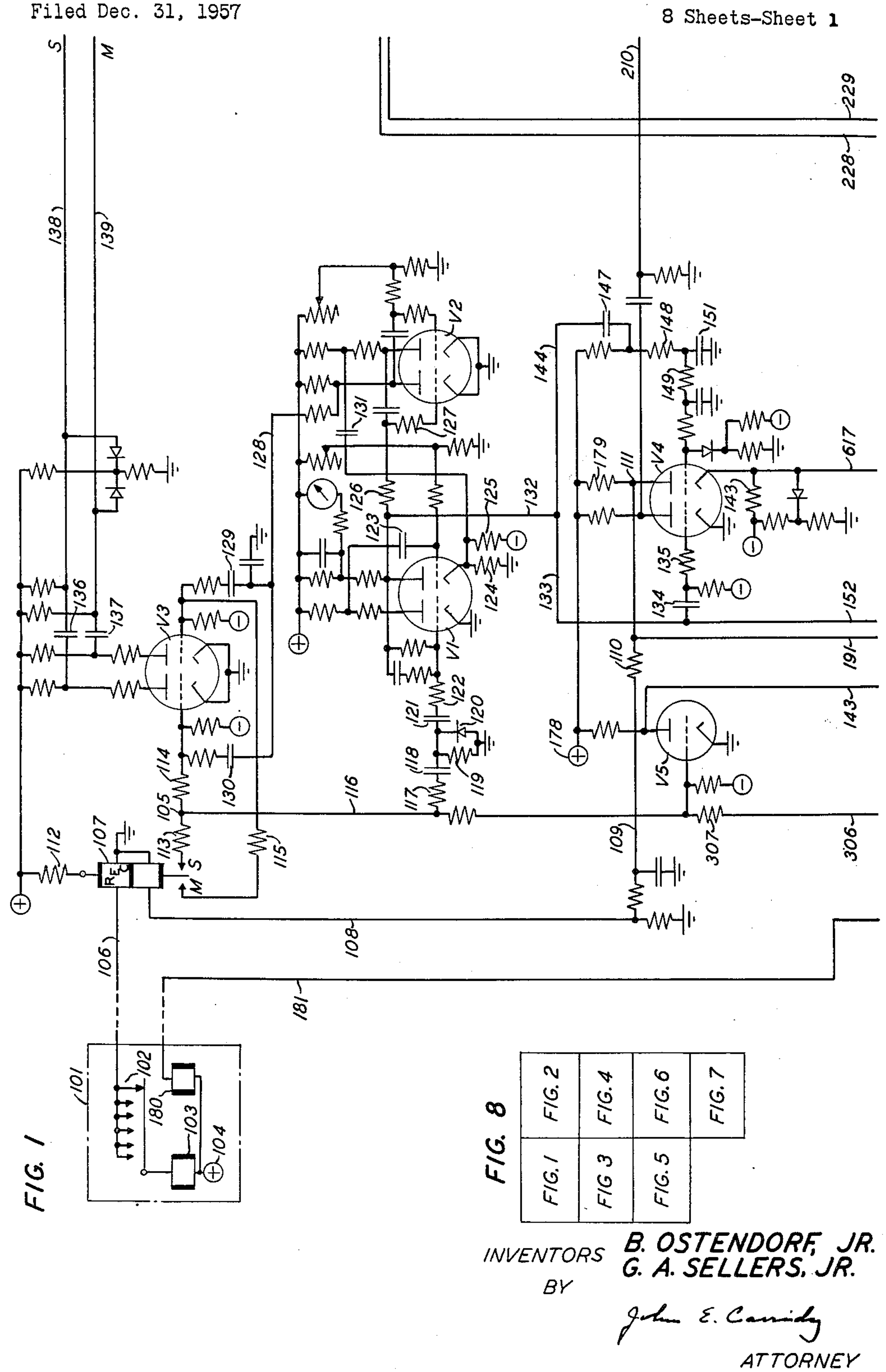

This invention relates to signal responsive selector mechanisms and particularly to instrumentalities for making selections under the conjoint control of two or more telegraph code combinations received in succession.

More especially the invention relates to an electronic circuit arrangement for decoding and giving effect combinationally to two or more successively received telegraph signals and for generating answer-back type of telegraph signals.

An object of the invention is to synthesize a permutation code signal by controlling non-linear circuit elements from an exponential wave.

A further object of the invention is to generate an answer-back signal by placing a plurality of electron discharge devices in non-conductive condition and controlling the subsequent conductive cycles of the electron discharge devices by means of a single voltage wave.

Another object of this invention is to electronically decode and register a permutation code signal combination and to automatically generate marking and spacing permutation code signal elements from a plurality of non-linear circuit elements under the control of an exponentially characterized timing arrangement.

The invention features a self-timing non-linear permutation code signal generating circuit controlled by a sequentially operated binary decoding gas tube stepping circuit.

In addition the invention features a pair of non-linear circuit elements, each one of the pair having control connections to an exponentially characterized voltage timing source and one of the pair having a control connection to the output of the other of the pair, which function to produce a succession of conducting and nonconducting intervals of predetermined durations.

The invention also features an electron discharge tube circuit having linear and non-linear elements in the cathode circuit thereof to enable the tube to function as a cathode follower and as an electronic switch.

Patent 2,766,318 granted October 9, 1956 to W. M. Bacon, G. J. Knandel, J. A. Krecek and G. A. Locke, discloses as part of an automatic teletypewriter switching system, a multistation line having one or more station control circuits each arranged to connect a teletypewriter station in message receiving relation to the line in response to address codes each comprising two permutation code signal combinations. An electromechanical selector mechanism for making a station selection in response to the combined selective attributes of two or more received code combinations is disclosed generally in the Bacon et al. patent, and is disclosed in considerably greater detail in Patent 2,543,174, granted February 27, 1951 to G. G. Keyes and in Patent 2,568,264 granted September 18, 1951 to W. J. Zenner. This electromechanical selector mechanism includes a plurality of pairs of individually selectable elements, one element being normally blocked against selection by a blocking lever which the other element, upon selection, disables. Upon reception of a particular code combination all of the unblocked or primarily selectable elements that are coded to respond to that code combination are selected and moved to operated positions, in which they become latched. In the latched positions, the primarily selectable elements unblock their associated secondarily selectable elements. Any unblocked selectable element is then free to respond to its selective code combination providing that code combination is next received, to close contacts or perform some other operation by which effect is given to the selection, such as the selection of a teletypewriter station. Following the selection of a secondarily selectable element, all of the operated primarily selectable elements are unlatched and restored to unoperated condition. The same signal may serve as the first code combination of other address codes, so that in the same receiving cycle in which a secondarily selectable element is selected and operated one or more of the primarily selectable elements may also be selected and operated. Each address code comprising two code combinations is followed by a Letters signal, the primary purpose of which is to place a teletypewriter printer in the lower case or unshift condition, but which is also sometimes used as an idling signal to provide time for switching or other operations or to perform supplementary functions not inconsistent with its use as an unshift signal. The supplementary function that the Letters signal performs as it follows the two-character address code is the unlatching of the primarily selectable elements that operate and latch in the same receiving cycle and in response to the same code combination as a secondarily selectable element.

It is the purpose of the system disclosed herein to perform the functions of the electromechanical selector mechanism by an electrical circuit arrangement of circuit components particularly employing space discharge devices and semiconductor devices.

Briefly, the electrical system for making selections in response to two or more code combinations successfully received includes a normally dormant oscillator that is held dormant under the control of a telegraph receiving relay associated with a telegraph line, the relay being held in a steady-marking condition by the current that flows in the rest condition of the line. When the receiving relay responds to the start element of a telegraph code combination, it sets in operation the oscillator and also triggers a monostable flip-flop circuit to its off-normal condition. The flip-flop circuit includes timing elements such that without external control it will return to its normal condition in an interval slightly longer than that of a received code combination. The frequency of the oscillator is such that each cycle has a duration equal to that of an element of correctly timed telegraph code signals. The flip-flop circuit, in the off-normal condition, is pulsed by the oscillator once in each cycle thereof, but the circuit constants of the flip-flop circuit prevent it from returning to normal condition until the oscillator circuit pulse associated with the last selecting code element of a received code combination occurs, at which instant the oscillator forces the return of the flip-flop circuit to normal condition, the oscillator being thereby stopped. The oscillator thus supplies the external control that restores the flip-flop circuit slightly ahead of the time at which its own circuit components would restore it.

Associated with the receiving relay is a pulsing circuit for separating received marking and spacing signal elements and for pulsing, under the control of the oscillator circuit one or the other of two conductive paths one of which is pulsed for marking elements and the other for spacing elements. The conductive paths that are pulsed selectively in accordance with the marking and spacing nature of received code elements are connected to discharge transferring cathodes of gas filled stepping tubes according to the arrangement of apparatus and principle of operation disclosed in M. A. Townsend Patent No. 2,606,309, granted August 5, 1952. This patent discloses a gas filled stepping tube in which there is directional selectivity in the stepping of a discharge from cathode to cathode in a fan circuit arrangement, whereby any one of a plurality of cathodes may be selected under the control of two types of code elements which may be designated as marking and spacing elements. The Townsend patent discloses a tube having eight final cathodes. In accordance with the teaching of Townsend, a discharge may be transferred to any one of the eight final cathodes in three steps under the control of three code elements. In the arrangement according to the present system, four such tubes are employed to provide a total of 32 final cathodes, which is the maximum number of selective possibilities of the five unit permutation code. Each of the tubes is operable in five steps, the first two of which are non-directional, the fanning beginning at the third step. By properly connecting the transfer control cathodes to the marking and spacing pulsing leads, a discharge will appear at an individual predetermined one of the thirty-two final cathodes for each code combination of the five unit permutation code.

The transfer of a discharge to a selected final cathode of one of the tubes causes a voltage to be impressed upon a memory or indication circuit connected to that particular final cathode. Each of the memory or indication circuits is a bistable single transistor flip-flop circuit having the arrangement and mode of operation described in copending application Serial No. 292,875, filed June 11, 1952, by B. Ostendorf, Jr., which issued on April 22, 1958 as Patent No. 2,831,983.

Each of the indication or memory circuits has associated with it one or more combiner circuits, the number of those circuits associated with a single memory circuit depending upon the number of selections that have the same first character. When a single transistor flip-flop circuit has been operated to the off-normal condition in recognition of reception of a character code, it causes the charging of a condenser in each of the combiner circuits connected to it. At the beginning of the next code combination received, the discharges are reset in the fan circuit gaseous stepping tubes, and upon the energization of a final cathode in response to the second code combination, a pulse is applied to the condenser of each of the combiner circuits associated with the particular final cathode. In the case of the combiner circuit which has its condenser charged by the associated code storage circuit, the pulsing of the condenser in the combiner circuit will cause the activation of a station-receiving circuit. The station-receiving circuit is a two-condition circuit, and when activated, it renders an associated teletypewriter receiving printer or reperforator responsive to signals received by the receiving relay.

One or more of the stations receiving circuits may be activated in the manner described above. When all of the address codes preceding a message have been decoded in this manner and the appropriate station receiving circuit activated, the signal for carriage return and line feed follow and are received ahead of the text of the message for the selected receiving station. In response to the decoded line feed signal, an activate-deactivate circuit, which is a two-condition circuit, is operated to the deactivate condition in which it imposes upon the station receiving circuit a condition preventing them from being activated in response to sequences of character code that appear in the text of the message and are the same as address codes. At the end of the message, a disconnect signal comprising the code for Figures, which is the upper case shift code, the opposite of the Letters signal, and an H Signal operate through a memory circuit and an associated combiner circuit to restore the activate-deactivate circuit to the activate condition, thereby rendering the station receiving circuits responsive to their appropriate two-character address code signals.

A further circuit that is controlled from the combiner circuits is one for recognizing non-valid address codes received by the receiving relay. Its purpose is to detect when the activate circuit is in the activate condition, that a sequence of two-character codes received as if representing a station address code does not correspond to the address code of any station served by the particular multistation line. Upon detecting that condition, it will activate a particular one of the station receiving circuits to receive the message that follows immediately or after other address codes. This arrangement prevents a loss of a message which has an invalid address code as it causes the message to be recorded and preserved at one of the stations, thereby enabling tracing procedures to be instituted in order to determine the proper address. Were it not for this feature a message might be lost entirely. As disclosed in the Bacon et al. patent, hereinbefore identified, a transmitter start circuit, which controls the transmission of the preparatory pattern of signals and the roll call, may interrupt message transmission for the purpose of making a roll call of transmitters. It is desirable to prevent the recording of the transmitter start roll call signal by the teletypewriter recorder of any station or stations that have been rendered responsive to message transmission, and this is the reason for blinding them. When the roll call has been completed, by the starting of a transmitter or by canvassing all transmitters without finding one conditioned for transmission, any teletypewriter recorder that was blinded is unblinded and message transmission is resumed.

Accordingly, in the system disclosed herein the electronic selector circuit arrangement responds to receipt of the transmitter start pattern comprising the signals Blanks-pause-Space to disable all receivers that are receiving traffic and to enable start code recognizing circuits.

The hereinbefore identified Bacon et al. patent and a copending application Serial No. 392,789, filed November 18, 1953 by W. M. Bacon-D. E. Branson-G. J. Knandel-G. A. Locke which issued on January 27, 1959 as Patent No. 2,871,286, discloses an arrangement for selectively starting the transmitters at any of the stations on a multistation line under the control of transmitter start signals received by an electromechanical selector mechanism from a switching center to which the multistation line is connected. The type of transmitter start signals employed in the two systems disclosed in the aforementioned patent and copending application are somewhat different, but in the system shown in the Bacon et al. copending application, they consist of: a blank signal, followed by a measured pause, during which the channel over which the signals are received remains in a steady-marking condition; a space signal ending the pause and indicating the nature of signals to follow and having the purpose of selectively and individually starting tape transmitters; single character signals each selectively pertaining to the starting of one of the transmitters; and, upon the starting of a transmitter which has been conditioned by the insertion therein of a message tape, or upon completion of a roll call of all transmitters without finding any having a message awaiting transmission, a Letters signal indicating the end of a transmitter start signal sequence.

The system disclosed herein comprises an electronic selector circuit arrangement for responding to transmitter start signals of the type hereinbefore described and for controlling the starting of any one of a plurality of telegraph transmitters associated with a multistation line comprising full duplex transmitting and receiving channels. As disclosed in the Bacon et al. copending application hereinbefore identified, a transmitter start circuit, which is located in the switching center serving the multistation line, may interrupt outgoing message transmission to one of the stations on the multistation line for the purpose of making a roll call of transmitters in order to initiate operation of a transmitter that is prepared to transmit to the switching center. It is desirable to prevent the recording of the transmitter start roll call signals by the teletypewriter recorder of any station or stations that have been receiving the message prior to interruption of transmission. The Blank signal and the pause, which precede the transmission of this space signal, are employed for blinding the recorders in order that they shall not respond to the code combinations comprising the selective transmitter starting signals. When the roll call has been completed, upon the starting of a transmitter or by canvassing a transmitter without finding one that has been conditioned for transmission, any teletypewriter recorder that had been blinded is unblinded and is thereby conditioned to respond to resumed message transmission.

Each station on the multistation line, upon receiving the signal for starting its transmitter, responds by initiating transmission of a message at one of the waiting transmitters or by automatically generating and transmitting the code combination for the letter H. The latter signal indicates that a transmitter has no message awaiting transmission and authorizes the transmitter start circuit at the remote switching center to continue the roll call of transmitters.

In accordance with the present invention, a circuit including electronic discharge components for generating the H Signals is activated at each station, which having responded to the signal for the starting of its transmitter, has no message material awaiting transmission. In this invention, the answer-back generating circuit is self-timing and independent of the character timer circuit of the electronic sequential selector and comprises three electron discharge tubes and associated control timing circuitry for causing the transmission of the marking and spacing elements of which the signal for the character H is comprised.

Figure 9:
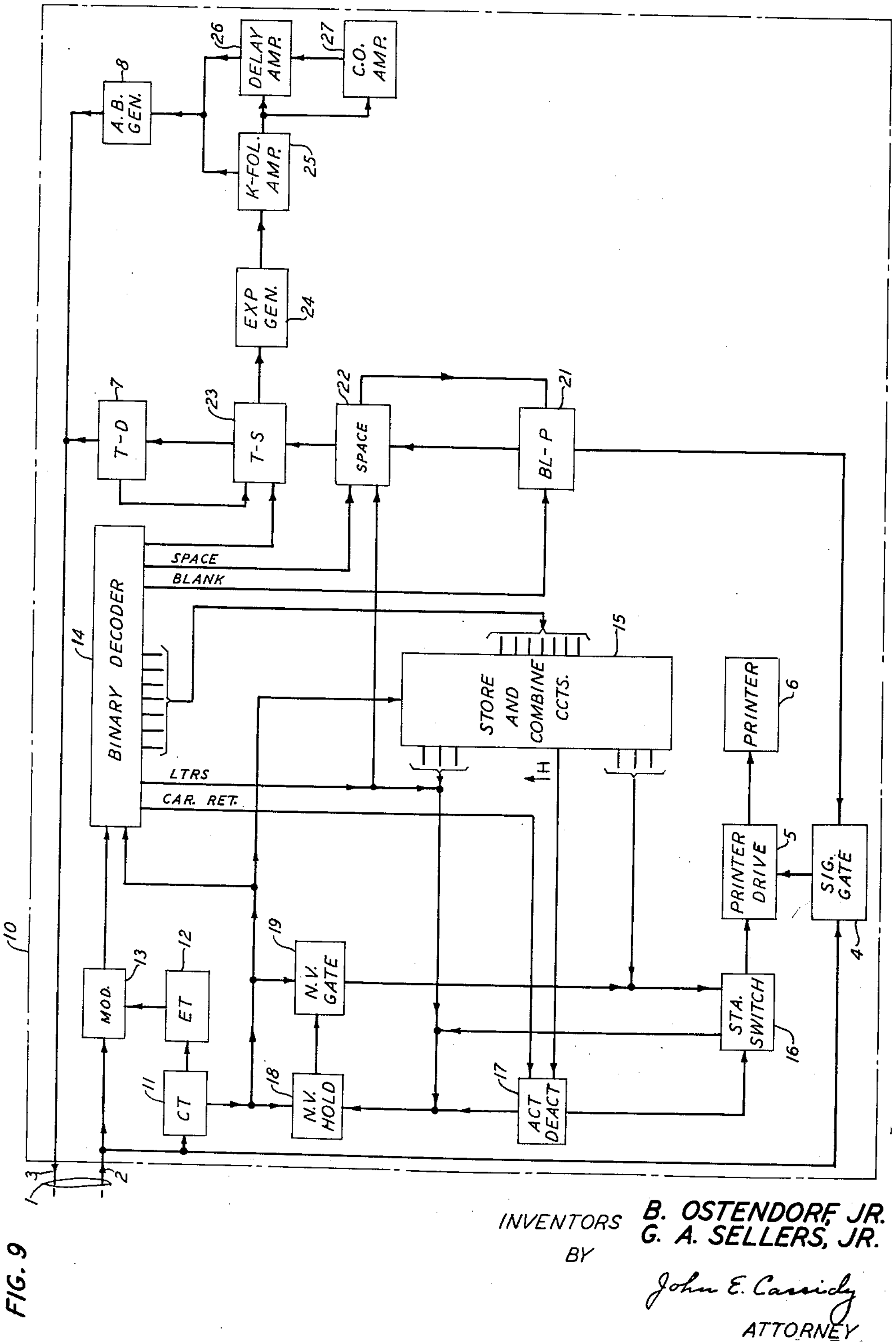

For a complete understanding of the invention, reference may be had to the following detailed description to be interpreted in light of the accompanying drawings in which:

FIGS. 1 to 7, inclusive, when arranged as shown in FIG. 8, show the complete circuits of an electronic system for selecting stations in response to address codes each comprising two-character code combinations, and for starting transmitters in response to single character transmitter start roll call signals and for generating the H answer-back signal when a station has no message material awaiting transmission; and FIG. 9 shows, in block form, the manner in which the circuits of the system cooperate.

The format of a message to be directed by the selector mechanism to a particular station is like that described in the copending application of Bacon et al. It comprises an address code for the station that is to be selected, which might be the two-character code BR, followed by a Letters Signal which in turn is followed by the Carriage Return and Line Feed signals. It is the function of the Carriage Return and Line Feed signals to condition the teletypewriter recorder at the selected station for printing at the beginning of a new line on the teletypewriter stationery. The Line Feed signal is also employed for deactivating the selector mechanism so that it shall not select other stations in response to character code sequences occurring in the body of the message that correspond to call directing or address codes. The Line Feed signal may also be followed by Letters Signal to afford a brief time interval between the Line Feed signal and the beginning of the body of the message. Such interval is not needed in connection with the operation of an electronic selector mechanism, such as that which will be described herein, because the circuits and components provide an inertialess system that is extremely fast in operation. It has been the custom to provide the interval to accommodate the operation of slower mechanical selector mechanisms so that the deactivation or other function could be completed before other signals were received. More than one address code may precede the Carriage Return and Line Feed signals, each being followed by a Letter Signal to set off the call directing codes from one another. The body of the message, including perhaps the identification of the called station as well as the calling station in full text, follows the Line Feed signal or the Letters Signal accompanying the Line Feed signal. At the conclusion of the message, the disconnect signal, comprising the code for FIG. H and Letters terminates the message.

Referring now to FIG. 9, a telegraph station, indicated by block 10, is shown terminating a full-duplex multistation line 1. Line 1 includes an incoming transmission channel 2 and an outgoing transmission channel 3 and extends to a control station, not shown, which provides the incoming signals on channel 2 and receives the outgoing signals on channel 3. It is to be understood that other stations similar to station 10 may be connected to line 1.

Station 10 includes printer 6 which prints message signals received from channel 2 by way of signal gate 4 and printer drive 5. Station 10 also includes transmitter-distributor 7 and answerback generator 8 which impress signals on channel 3.

In order to cut-on printer 6 to receive message signals, the control station sends a two-character code sequence individual to printer 6 followed by a Letters character. Other printers connectable to channel 2 may also be cut-on by sequences individual thereto. At the end of the address signals, the central station sends the character Carriage-Return followed by the message text, which message is concluded by the code combination for FIGURES, followed by the code combination for H.

The reception of the start signal element of each character from channel 2 operates character timer 11 to the off-normal condition. Character timer 11 remains in the off-normal condition until substantially the end of the character whereupon it self-restores to the normal condition. While character timer 11 is in the off-normal condition, element timer 12 applies a pulse to modulator 13 at the center of each received character element. Modulator 13 sends a signal to binary decoder 14 in response to each element timer pulse and in accordance with the marking or spacing condition of channel 2.

Binary decoder 14 comprises a plurality of decoder tubes which selectively energize a predetermined output terminal in accordance with the code character received from channel 2. Assuming now that the first character of a two-character cut-on sequence is received, binary decoder 14 energizes a selected lead which extends to the store and combiner circuits, generally indicated by block 15, and circuits 15 in response thereto register an indication of the character.

At the conclusion of the reception of the first character, character timer 11 self-restores to its normal condition resetting binary decoder 14 and preparing circuits 15 for the reception of the next character. The storage registration in circuits 15 will be maintained however until after the next character is received.

The reception of the next character again energizes a selected output lead of binary decoder 14, which, in turn, and incident to the registration of the previous character, energizes a selected output lead of circuits 15. Assuming the two-code sequence is individual to printer 6, the lead extending from circuits 15 to station switch 16 is energized enabling switch 16, which in turn instructs printer drive 5 to cut-on printer 6. Printer 6 thereafter prints the signals received from channel 2.

As previously disclosed, all messages are termniated by the code sequence Figures H. The reception of the code sequence Figures H energizes a selected output lead on circuits 15 in a manner similar to the energization of an output lead in response to a two-character cut-on sequence. The lead energized by the sequence Figures H extends to activate-deactivate circuit 17, operating circuit 17 to the activate condition. While circuit 17 is in the activate condition, switch 16 is maintained in the activate condition enabling switch 16 to be responsive to the energization of the previously described output lead of circuits 15.

At the conclusion of the address signals, but prior to the message text, the character Carriage-Return is received, energizing an output lead of decoder 14 which extends to circuit 17 restoring circuit 17 to the deactivated condition. Circuit 17 in turn restores switch 16 to the deactivate condition whereby switch 16 is nonresponsive to the cut-on code sequences received in the message text. Thus printer 6 cannot be cut-on during the transmission of the message text.

Station 10 is arranged to cut-on printer 6 in the event that an address code sequence is received which is not valid for line 1. The circuit always attempts to cut-on printer 6 by passing a pulse from character timer 11, by way of nonvalid gate 19, to switch 16, when character timer 11 restores to the normal condition. Gate 19, however, is normally blocked unless it is enabled by nonvalid hold circuit 18 which blocks gate 19 when the hold circuit is in the normal condition. When character timer 11 restores to the normal condition at the end of the character, nonvalid hold circuit 18 operates, after a short delay, to the off-normal condition, whereby gate 19 is enabled and maintained enabled in preparation for the reception of the next character. Thus at the conclusion of the next character, the pulse from character timer 11 will pass through gate 19 unless hold circuit 18 is reset.

Nonvalid hold circuit 18 is reset by the following conditions:

(1) The energization of a selected output lead of decoder 14 in response to the Letters character;

(2) The deactivated condition of circuit 17;

(3) The enabling of switch 16 in response to the cut-on sequence; and (4) The energization of a selected output lead of circuits 15 in response to a cut-on code sequence valid for other stations on line 1.

Thus printer 6 will be cut-on if circuit 17 is in the activate condition and a two-code sequence is received which is not valid for line 1 and does not contain a Letters character.

The control station may start transmitter-distributor 7 by sending a signal pattern consisting of the code character Blank followed by a pause and, subsequent to the pause, the character Space, then the transmitter start character individual to transmitter-distributor 7 and finally the character Letters. In response to the character Blank, decoder 14 energizes a selected lead extending to blank-pause circuit 21, whereupon circuit 21 times the subsequent pause and blocks signal gate 4 to blind printer 6 to incoming signals. If the pause is of proper length, circuit 21 prepares space circuit 22 for the reception of the space signal. In the event, however, that the space signal is not received at this time, circuit 21 restores and renders space circuit 22 unresponsive to the next signal. In addition, the restoration of circuit 21 unblinds printer 6.

In the event the space signal is received at the proper time energizing a selected output lead of decoder 14 extending to space circuit 22, circuit 22 prepares transmitter start circuit 23 for the subsequent transmitter start character and prevents the restoration of blank-pause circuit 21. Upon the reception of the proper transmitter start character, transmitter start circuit 23 then starts transmitter-distributor 7, if the transmitter is supplied with tape, whereupon transmitter-distributor 7 impresses the message upon channel 3 in accordance with the message tape supplied thereto. The start sequence is terminated by the character Letters, energizing a selected output lead of decoder 14 which extends to space circuit 22. Space circuit 22 in turn permits the restoration of blank-pause circuit 21 which unblinds printer 6.

In the event transmitter-distributor 7 is not supplied with a message tape when the start character is received, the transmitter does not start. Under this condition the code combination for the letter H is automatically generated, in the following manner, to inform the control station that there is no message to be transmitted from the polled station.

The transmitter circuit 23 energizes exponential generator 24 which applies an exponential wave to cathode follower amplifier 25 and to delay amplifier 26 and cut-off amplifier 27 by way of cathode follower 25. At the initial level of the exponential wave, amplifier 25 is cut off and amplifiers 26 and 27 are maintained in the cut-off condition. With amplifiers 25 and 26 cut off, answerback generator 8 impresses a spacing condition on channel 3. When the exponential wave rises to a predetermined level, delay amplifier 26 cuts on whereupon answerback generator 8 restores channel 3 to the marking condition. At a subsequent level of the exponential wave, cut-off amplifier 27 cuts on, cutting off amplifier 26 and answerback generator 8 returns channel 3 to the spacing condition. When the exponential wave returns substantially to its quiescent level, cathode follower amplifier cuts on and answerback generator 8 restores channel 3 to the normal marking condition. The timing of the sequence of the cut-on and cut-off conditions of amplifiers 25 and 26 and the consequent spacing and marking conditions impressed on channel 3 by answerback generator 8 is such that a permutation of signal elements comprising the code character H is sent to the central station indicating that no message is available in transmitter-distributor 7.

In the description which is to follow, the circuit components and the several figures of the drawing are identified by three-digit reference numerals, the first digit of which identifies the figure of the drawings in which the element or component appears, and the other two digits distinguish among the components in each figure of the drawing. An exception to this rule is the case of certain conductive paths which extend from one sheet of drawing to another. A conductive path carries the same reference numerals from its point of beginning to its terminance or to a junction with one or more of conductors.

Where the magnitudes of constants are mentioned in the following description it is to be understood that it is by way of example, only as an aid in understanding the invention.

Referring now to FIG. 1 of the drawings, in the upper left-hand portion thereof there is shown a telegraph station 101, which is a point of origin or of transfer for messages to be switched through the switching apparatus embodying the present invention to one or more receiving stations. In a switching system such as that shown in the Bacon et al. Patent 2,766,318, a station corresponding to station 101 may be a switching center where messages received from various telegraph stations over lines or trunks are relayed to selected outgoing channels for retransmission toward ultimate destinations. For the purpose of simplicity, station 101 herein has been shown merely as a message source comprising a telegraph transmitter 102 of conventional type associated with a teletypewriter recorder for producing a home record or monitor copy of message material transmitted, the teletypewriter being represented symbolically by selector magnet 103 and a signal receiver represented symbolically by selector magnet 180. A positive battery connection 104 for supplying transmission current is provided at station 101 and the station is connected by transmission channel 181 to transmitters 313 and 316, FIG. 3, by way of the armature and marking contact of relay 3H and by transmission channel 106 to the input of the selector mechanism, the input being receiving relay 107 which has line conductor 106 connected to one terminal of its operating winding and ground connected to the other terminal thereof. Current flowing through the operating winding during the idle condition, when no messages are being transmitted, causes the armature of relay 107 to engage its marking contact. Line relay 107 is arranged for neutral operation having a lower biasing winding, one end of which is connected to ground and the other end of which is connected to conductor 108. Bias current for relay 107 is provided via circuit extending from battery 178 through resistor 179, junction 111, resistor 110, conductor 109, and the bottom winding of relay 107 to ground. When the transmitter 102 at station 101 interrupts the current to the operating winding of relay 107, current in the lower circuit just traced operates the armature of relay 107 to its spacing contact.

It is to be understood that the signal trains employed herein each comprise seven elements, consisting of a start element, five intelligence determining elements and a stop element. The start element is always a spacing signal element. The five character determining elements may each be either marking or spacing and the stop element is always a marking signal element.

Positive battery is connected through resistor 112 to the armature of relay 107. All positive battery indications represent a voltage of 260 volts relative to ground and all negative battery terminations not otherwise identified herein represent battery connections of 160 volts negative with respect to ground.

The marking contact associated with the armature of relay 107 is connected through resistor 115 to the grid of the right-hand triode of electron discharge tube V3, which is preferably a vacuum tube. The spacing contact associated with the armature of relay 107 is connected through resistors 113 and 114 to the grid of the left-hand triode section of tube V3. Both triode sections of tube V3 are biased substantially to cut off by virtue of negative battery connections to the grids thereof, and the cathodes of the left-hand and right-hand triodes of tube V3 are connected to ground. The bias on both triodes of tube V3 is such that neither triode is conductive in the idle condition of the circuit, with the relay armature on its marking contact, and moreover the bias on the grids of tube V3 is such that when the armature of relay 107 operates to spacing, the reduction in negative bias on the left-hand triode of tube V3 is not sufficient to render that triode conductive.

The positive potential that is applied to the grid of the left-hand triode of tube V3 via resistors 113 and 114 is extended at junction point 105 between these resistors over conductor 116, resistor 117, capacitors 118 and 121, and resistor 122 to the grid of the left-hand triode of tube V1. Tube V1 is a monostable flip-flop circuit and its purpose is to time a received code combination. Its normal condition, prior to the response of relay 107 to the start element of a code combination, is that the left-hand triode is cut off and the right-hand triode is conducting. In this normal condition, with the right-hand triode conducting, a negative potential at the cathode of the right-hand triode applied through the potential divider comprising resistors 124 and 125 connected between negative battery and ground holds the right-hand anode at negative potential and this potential is applied to the grid of the left-hand triode of tube V2 via resistors 126 and 127 holding that triode cut off. When this cut-off voltage is removed, tube V2 is a free-running multivibrator which has symmetrical half cycles and provides a timing wave, each cycle of which has a duration equal to correctly timed start and selecting elements of code combinations.

When a positive pulse is applied to the grid of the left-hand triode of tube V1 over a previously traced path, as relay 107 responds to the start element of a code combination, that triode is rendered conductive, and due to the flip-flop connection including capacitor 123 to the grid of the right-hand triode, this later triode cuts off. The right-hand anode of tube V1 swings positive and holds the left-hand triode conductive through a clamping connection to the grid of the latter triode for the interval in which the right-hand triode remains cut off. Resistor 119 and varistor 120, connected from the junction of capacitors 118 and 121 to ground, bypasses the negative pulses resulting from the return of the armature of relay 107 to the marking contact so that the left-hand triode of tube V1 is not influenced by that return. The constants of the elements of the timing circuit comprising capacitor 123 and resistors associated with the grid of the right-hand triode of tube V1, which circuit times the interval for self-restoration of tube V1 to its normal condition, have such values that the interval is slightly longer than the duration of 5½ elements of correctly timed signals, thereby bringing the time of self-restoration into the interval between the middle of the fifth selecting code element and the beginning of the stop element. An external influence from the free-running multivibrator comprising tube V2 accelerates the time of restoration of tube V1 as will be described hereinafter.

With tube V1 in its off-normal condition, the right-hand anode of the tube is positive and this potential is impressed upon the left-hand grid of tube V2 permitting that tube to operate as a multivibrator. The left-hand triode of tube V2 conducts during the first half of a received start element, and the right-hand triode conducts during the last half of the start element and during the last half of each received significant element. It follows from this that the left-hand anode of tube V2 swings negative at the beginning of the start element and at the beginning of each selecting element, and swings toward positive at the middle of the start element and the middle of each selecting element. The left-hand anode of multivibrator tube V2 is connected through conductor 128 and branching paths to the grids of tube V3, each of these branching paths including an individual blocking capacitor 129 and 130. The positive swing is sufficient to render one or the other of the triodes of tube V3 conductive momentarily, depending upon the position of the armature of relay 107 at the time of occurrence of the pulse. If the armature is on the spacing contact, biasing the left-hand triode more positively than the right-hand triode, the former triode will conduct momentarily during the pulse. On the contrary, if the armature engages a marking contact, biasing the right-hand triode more positively than the left-hand triode, the former triode will conduct momentarily. The external control for accurately timing the restoration of tube V1 to normal condition is derived from the right-hand anode of tube V2 and is supplied through capacitor 131 to the right-hand cathode of tube V1. While tube V2 is operating as a free-running multivibrator, a negative charge on capacitor 123, through which the right-hand triode of tube V1 was cut off, is leaking off and the potential of the right-hand grid of tube V1 is rising toward positive. Since the left-hand triode of tube V2 swings toward negative at the beginning of each code element and swings towards positive at the middle of each code element, it follows that the right-hand anode of tube V2 swings toward positive at the beginning of each code element and towards negative at the middle of each code element. These voltage swings are applied through capacitor 131 to the right-hand cathode of tube V1. The positive swings merely increase the negative bias on the right-hand triods of tube V1. The negative swings, being swings toward the potential of the grid, reduce the bias of the right-hand triode of tube V1. When the negative cathode swing occurring at the middle of the fourth element occurs, capacitor 123 has not lost enough of its negative charge to permit the cathode swing to render the right-hand triode of tube V1 conductive. However, at the next negative swing of the cathode, which occurs at the middle of the fifth code element, the potential of the right-hand grid of tube V1 has risen toward positive sufficiently so that the negative cathode swing will render the right-hand triode of tube V1 conductive. The right-hand anode of tube V1 swings toward negative, cutting off the left-hand triode and holding it cut off until the next positive pulse is applied through capacitors 118 and 121. This pulse should occur at the start transition of the next received code combination, because relay 107 returns to marking for the stop and rest condition following the fifth code element, applying a negative pulse to capacitor 118 as the armature of the relay returns to marking. With the monostable flip-flop circuit comprising tube V1 in its normal condition, the operation of the free-running multivibrator tube V2 is suspended and that multivibrator remains in its rest condition with the right-hand triode conductive and the left-hand triode cut off.

It was previously stated that the grids of tube V3 are pulsed positively at the middle of each received code element, the right-hand triode conducting momentarily when a marking condition is being received and the left-hand triode conducting momentarily when a spacing condition is received. The external anode circuit of the left-hand triode of tube V3 includes a connection to output conductor 138 via capacitor 136. The external anode circuit of the right-hand triode of tube V3 includes a connection to output conductor 139 via capacitor 137. A control pulse is impressed on conductor 139 via capacitor 137 at the middle of each marking code element and a control pulse is impressed upon conductor 138 via capacitor 136 at the middle at each spacing code element.

Figure 2:
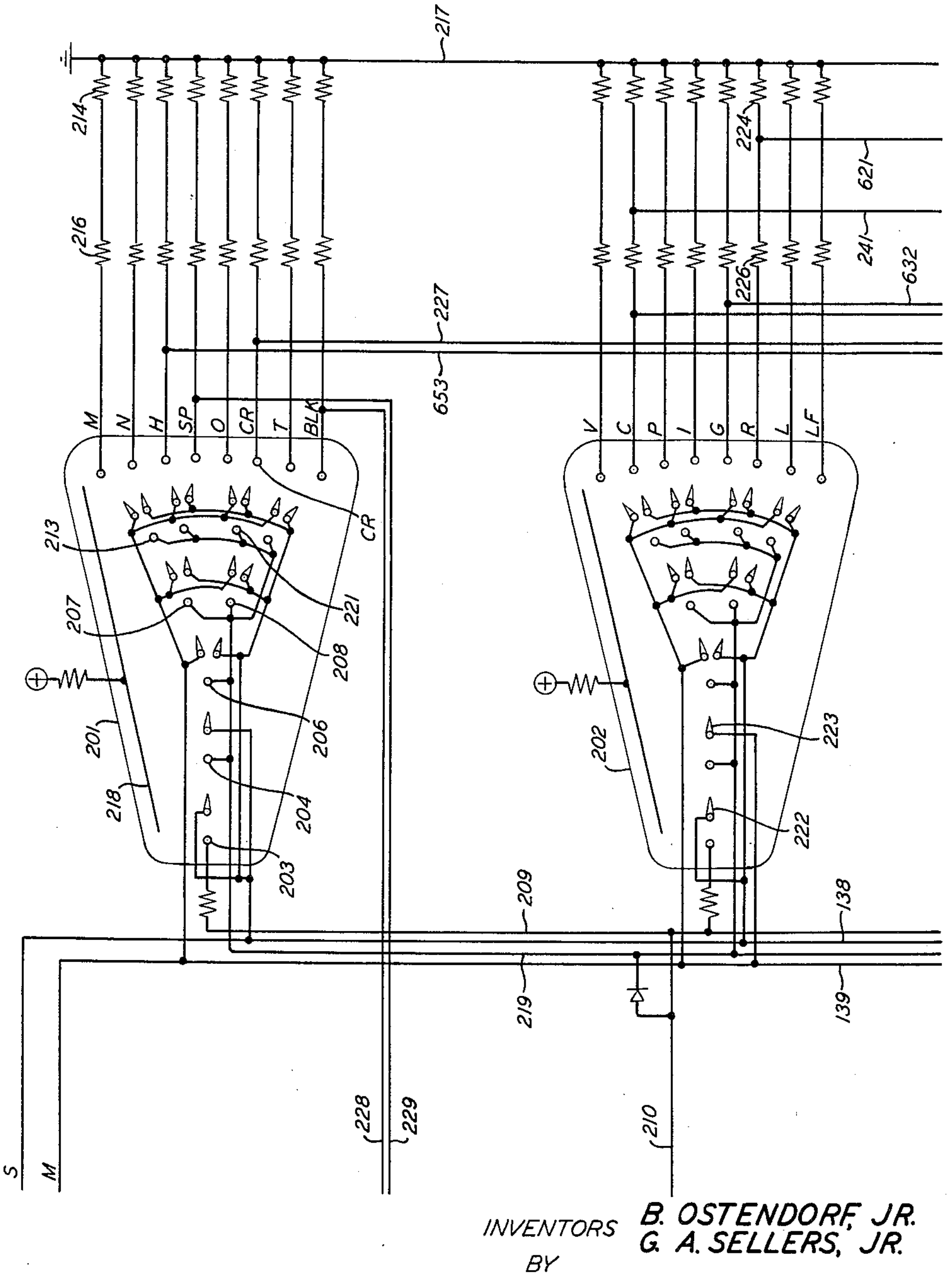
Figure 4:
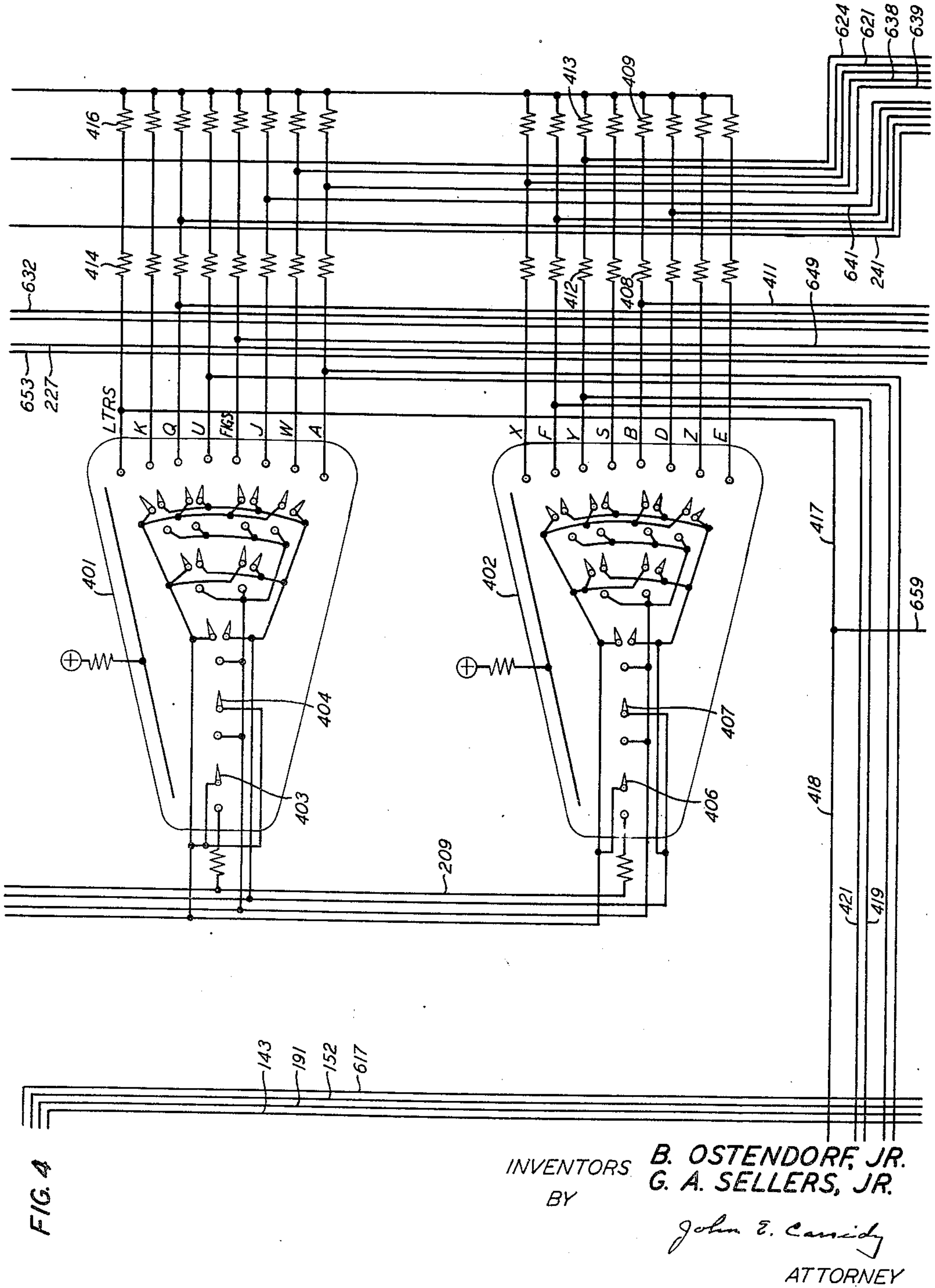

In FIGS. 2 and 4 are shown four gas-filled stepping tubes 201, 202, 401, and 402. Each of these tubes contains an anode and two different types of cathodes usually designated as the A and B cathodes, the A cathodes being represented by small circles and the B cathodes being represented by triangles, each pointing toward an individual one of the A cathodes. The A cathodes are all returned to a point at or near ground, and the B cathodes are connected selectively to the marking and spacing control conductors 139 and 138. The A cathodes are rest cathodes and a steady-state discharge will exist between any one of the A cathodes and the anode. The B cathodes are transfer cathodes, and will transfer a discharge from one A cathode to another in one direction only, which is the reason the tube is called a stepping tube. The cathode at the point of beginning of the stepping path is called a reset cathode, and the pulsing of that cathode will cause the transfer of a discharge to it from any other cathode in the tube that is then conducting a discharge.

Referring now specifically to FIG. 2, the reset cathode in tube 201 is designated by the reference numeral 203. Immediately to the right of reset cathode 203 is the B cathode which, when pulsed, will cause the discharge to transfer from reset cathode 203 to A cathode 204. To the right of this cathode is another B cathode which, upon being pulsed, will cause the discharge to transfer to A cathode 206. To the right of the latter cathode is a pair of B cathodes, and the pulsing of one of these will cause the selective transfer of the discharge to either of the A cathodes 207 or 208. To the right of each of the cathodes 207 or 208 is a pair of B cathodes, and the pulsing of any one of these will cause the selective transfer of the discharge to any one of four A cathodes. Similarly, there is a pair of B cathodes to the right of each of the four A cathodes, and the selective pulsing of any one of these will cause the transfer of the discharge to any one of eight final B cathodes.

Reset cathode 203 is connected by conductors 209, and 210 to the anode of the left-hand triode of tube V4 in FIG. 1. A pulsing connection from the anode of the right-hand triode of character timer flip-flop tube V1 extends over conductors 132 and 133, through capacitor 134 and resistor 135 to the left-hand grid of tube V4. The circuitry of tube V4 comprises a simple amplifier circuit whose input is a differentiated square wave obtained from the right-hand triode of tube V1 and this circuit acts as the decoder reset stage. The time constant of the differentiator circuit including capacitor 134 and resistor 135 is arranged to maintain a positive condition on the normally negatively biased grid of the left-hand triode of tube V4 when the right-hand triode of flip-flop tube V1 is rendered nonconductive at the beginning of a start element of a code combination and its anode swings toward negative thereby applying a positive pulse over conductors 132 and 133 and through the differentiator circuit of capacitor 134 and resistor 135, to the grid of left-hand triode of tube V4. As the left-hand triode of tube V4 conducts a negative pulse is applied over conductors 210 and 209 to reset cathode 203 to transfer the discharge to that cathode. Accordingly, the reset cathode 203 is held negative for a period determined by the time constants of the differentiator, which period equals the duration of the original received start element thereby to preclude a transfer of a discharge from the reset cathode by the pulsing of an adjacent B cathode during the interval the start element is received. Thus the received start element, which is not one of the five information bearing selecting pulses of the telegraph character, does not act to step decoding tube 201. It will be noted that the B cathode immediately to the right of the reset cathode 203 is connected to spacing conductor 138 which is pulsed about the middle of the received start element. This pulsing of the B cathode does not result in the transfer of the discharge from the A cathode of tube 204 because this cathode cannot effect a transfer until the reset cathode has returned to its normal potential near ground. The reset cathode in the other three tubes are also connected to conductor 209, so that the discharge is reset in these tubes during the reception of the start element and is prevented from being stepped during that element.

The first B or transfer cathode in tube 201 is connected to spacing pulse conductor 138, as is also the second B cathode. It follows from this that the first spacing element received after the start element will cause the transfer of a discharge from reset cathode 203 to rest cathode 204, and the next spacing element will cause another transfer to rest cathode 206. From that point on, the transfer cathodes appear in pairs, doubling in number for each step, and comprising one, two, and four pairs. The upper transfer cathode of each pair is connected to the marking pulse conductor 139, and the lower one is connected to the spacing pulse conductor 138. A marking pulse occurring on conductor 139 when the discharge is at rest cathode 206 will cause the discharge to transfer to rest cathode 207, whereas a spacing pulse will cause it to transfer to rest cathode 208. By similar selective transfer in the next two ranks of transfer cathodes, the discharge may be brought to any one of eight final rest cathodes.

The eight final rest cathodes have been designated by the character or function signals to which they correspond. For example, should the received signal comprise two spacing elements followed by three marking elements, the discharge will be reset to cathode 203 during the start element, will be transferred to rest cathode 204 during the first spacing element to rest cathode 206 during the second spacing element, to rest cathode 207 during the first marking element, which is the third element of the code combination, to rest cathode 213 during the second marking element, which is the fourth element of the code combination, and to final cathode M during the third marking element, which is the fifth element of the code combination. The final cathode M is connected through resistors 216 and 214 to ground conductor 217 and a discharge current flows from ground through those resistors and from final cathode M to anode 218, which is common to all of the cathodes of the tube. All rest cathodes in tube 201 other than the final cathodes are connected to conductor 219 which is grounded. If the code combination for Carriage Return, which consists of the code element Space, Space, Space, Mark, Space, should be received, the discharge will transfer from reset cathode 203 to rest cathode 204 in response to the first spacing element, to rest cathode 206 in response to the second spacing element, to rest cathode 208 in response to the third spacing element, to rest cathode 221 in response to the first marking element, and to rest cathode CR in response to the final spacing element.

Consideration will now be given to the response of tube 201 to a signal which does not have its first two code elements of spacing nature. It will be supposed that the signal for the character W, which is comprised of the elements, Mark, Mark, Space, Space, Mark, is received. Since the transfer of the discharge from reset cathode 203 occurs only in response to spacing elements in tube 201, the discharge will remain on reset cathode 203 during the first two elements of the code combination for W. In response to the third element, which is of spacing nature, the discharge will transfer to the rest cathode 204 and during the fourth code element, which is also of spacing nature, a discharge will transfer to rest cathode 206. During the final code element, which is of marking nature, a discharge will transfer to rest cathode 207. Since the code combination contains no more code elements, the discharge will not advance beyond this point, but will be reset during the start element of the next received code combination. Thus, the discharge will reach one of the final cathodes in tube 201 only in response to code combinations corresponding to one of the eight characters or functions by which those eight final cathode outputs are identified. These are the code combinations which have the first and second elements of spacing nature.

Tube 202 has its first transfer cathode 222 connected to spacing pulse conductor 138, and its second transfer cathode 223 connected to marking pulse conductor 139. The remaining transfer cathodes are connected to conductors 138 and 139 in the same manner as those of tube 201, and tube 202 provides selective response for those eight code combinations which have the first element of spacing nature and the second element of marking nature. Similarly, tube 401 is effectively responsive to the eight code combinations having the first and second elements of marking nature, by having first and second transfer cathode 403 and 404 connected to marking pulse conductor 139, and tube 402 is effectively responsive to the eight code combinations having the first element of marking and the second element of spacing nature, by having the first transfer cathode 406 connected to marking pulse conductor 139 and the second transfer cathode 407 connected to spacing pulse conductor 138.

As previously stated, the selector mechanisms being described herein, actuate selections in response to call directing codes comprising two characters. In order to do this, it is necessary to register and store an indication of reception of any first code combination in order to produce a combinational result from two successively received code combinations. The instrumentality used for registering the reception of code combinations is a single transistor flip-flop circuit shown in FIG. 6. This circuit is fully described and claimed in copending application Serial No. 292,875, filed June 11, 1952 by B. Ostendorf, Jr., hereinbefore identified and the disclosure of that application is incorporated herein by reference as if fully disclosed in the present specification. It will be described in the present specification only to the extent necessary to convey an understanding of its operation for the purposes of the present invention.

It will be assumed that a message is transmitted from station 101 preceded by the address code BR. The code combination for the character B has its first code element of marking nature and its second code element of a spacing nature, and the code combination is effectively decoded by stepping tube 402 to establish a discharge at final rest cathode B and a resulting flow of current through resistors 408 and 409 to ground. The establishment of a discharge to final rest cathode B results in a swing of that cathode toward positive, and the swing is impressed over conductor 411 to the left-hand terminal of capacitor 601. The other terminal of capacitor 601 is connected to the base 603 of transistor 604, and the base is also connected through resistor 606 to ground.

The collector 607 of transistor 604 is connected through resistor 608 to a negative potential source. Resistor 608 is relatively of small resistance, perhaps of the order of 820 ohms, and the battery connection serves to bias the collector in a reverse direction and is perhaps of the order of 26 volts.

The emitter electrode 609 is returned to negative potential through the load line resistor 611 which is large in comparison with the internal emitter resistance of the transmitter and in one embodiment of the invention and has a value of 3 megohms. The negative voltage to which the emitter is returned through resistor 611 is the full negative battery potential of 160 volts. The emitter also has connection through self-biasing resistor 612 to base 603, through capacitor 613 to ground, and through the crystal diode or varistor 614, and conductors 616 and 617 to the cathode of the right-hand triode of tube V4 which is connected through resistor 143 to a negative battery supply of 45 volts. In the steady-state condition of the right-hand triode of tube V4, the tube is sufficiently conductive to provide a potential of approximately 11½ volts negative at the cathode, and this is the potential applied to the left-hand termnial of varistor 614.

With the circuit arrangement of the transistor as described, the transistor is normally held cut off by small negative bias current flowing through resistor 611 from a negative battery supply. At the time of the positive voltage swing applied to conductor 411 by the final rest cathode B, a positive pulse is applied through capacitor 601 to the transistor base 603. This pulse effects no change in the steady-state condition of the transistor. During the interval of the start element of the next received signal combination, the discharge is reset in the stepping tubes 201, 202, 401, and 402. The final cathode B returns to ground potential, applying a negative-going pulse through capacitor 601 to transistor base 603. The negative transition applied to the transistor base causes the emitter 609 to be momentarily more positive than the base and hence positive current flows from the base to the collector. Feedback action due to collector current is now obtained because of resistor 606 to ground. This feedback causes an even more negative excursion of the base, and the emitter is pulled negatively along with the base because of the low internal emitter-to-base resistance. Upon reaching the holding potential approximately negative 11.5 volts applied over conductor 616, the varistor 614 becomes a low impedance source of current supplying a high value of emitter current, which in turn sustains a high collector current. When the circuit has stabilized in a new condition the collector-to-ground voltage is about negative 26 volts, an increase in potential of approximately 10 volts. The transistor is stable in this new condition which is its off-normal condition.

The collector electrode 607 of the transistor is connected through resistor 618 to one terminal of capacitor 619, the other terminal of which is connected over conductor 621 to the junction of resistors 224 and 226 connected between the final cathode R of stepping tube 202 and grounded conductor 217. The same transistor collector electrode is also connected through resistor 622 to one terminal of capacitor 623, the other terminal of which is connected over conductor 624 to the junction of resistors 412 and 413 connected in series between final cathode Y of stepping 402 and grounded conductor 217. The circuit comprising resistor 618 and capacitor 619 is a combiner circuit which is primed by transistor 604 in preparation for possible reception and decoding of the code combination for the character R. Similarly, the circuit comprising resistor 622 and capacitor 623 is a combiner circuit that is primed by the same transistor 604 in anticipation of possible reception of the code combination for the character Y. In the off-normal stable condition, collector electrode 607 of the transistor is more positive than it is in a normal stable condition, and the increase in potential causes a charging current to flow through resistors 618 and 622 to charge capacitors 619 and 623, respectively.

When the code combination of the character R has been decoded by tube 202, a discharge is established between final cathode R and the anode of tube 202 to produce a positive voltage swing of the junction of resistors 224 and 226. A positive voltage swing, occurring about the middle of the fifth element of the code combination, is impressed on capacitor 619 and is in additive relation to the charge impressed thereon by transistor 604. The resultant pulse, applied through crystal diode 626 and conductor 627 to the control grid of tube V7 renders that tube conducting for the duration of the pulse. The positive screen voltage for tube V7 is removable under circumstances to be described hereinafter, but it will be assumed that the tube has proper screen voltage and that the positive pulse on its control grid will render it conductive. The anode of V7 is coupled via conductor 701 through capacitor 702 and resistor 703 to the left-hand grid of tube V8. Tube V8 has circuit connections establishing a bistable flip-flop circuit and it may be assumed to be conductive in its left-hand triode at this time. The right-hand triode of tube V8 is nonconductive at this time and holds the control grid of tube V9 sufficiently positive so that the latter tube is insensitive to negative potential applied from the anode of tube V5 over conductor 143 to the control grid of tube V9 each time the armature of receiving relay 107 operates to spacing. The negative swing of the anode of tube V7, as it becomes conductive, cuts off the left-hand triode of tube V8 which renders the right-hand triode conductive. The negative swing of the right-hand anode of tube V8, as it becomes conductive, lowers the positive potential of the control grid of tube V9 established by the potential divider circuit comprising resistors 705, 706, 707, and 708. The resulting potential on the control grid of tube V9 brings it close to the threshold of nonconductivity but the tube is not rendered nonconductive under the control of the right-hand anode of tube V8 alone. The anode circuit of tube V9, in which current is flowing in the marking condition, includes the operating winding of repeating relay 711 which has its armature held in engagement with the marking contacts by current through operating winding of that relay. A circuit through the armature and marking contact of repeating relay 711 includes the selector magnet 712 of a receiving teletypewriter station 713, which is the station designated by the address code BR. When current ceases to flow in the anode circuit of tube V9, the armature of relay 711 moves out of engagement with the marking contact, impressing a spacing element upon the selector magnet 712.

The code combination for the letter R, in common with fifteen other code combinations of the five unit code, has a fifth code element of spacing nature. Since tube V7 is rendered conductive momentarily, about the middle of that element, the armature of receiving relay 107 is engaging a spacing contact, raising the grid voltage of triode V5 by way of resistor 113 and conductor 116 to render the tube conductive and thus applying a negative potential over conductor 143 to the grid of tube V9. Since this is the final code element of a code combination, it would be undesirable to permit receiving teletypewriter 713 to respond to that code element, which it would interpret as a start element of a code combination. The removal of the positive holding bias on the control grid of tube V9 is delayed by capacitor 714 connected to the junction of resistors 706 and 707, the delay extending well into the time of reception of the stop element following the final code element. When the positive holding potential is removed from the grid of tube V9 the selector magnet 712 of teletypewriter 713 will respond to all signals received by receiving relay 107.

As previously stated, the character timer tube V1 is restored to its initial condition at the time of generation of the discharge stepping pulse for the fifth element of the code combination. The return of tube V1 to normal condition involves restoration of conductivity in the right-hand triode and cutting off of the left-hand triode. As conductivity is restored in the right-hand triode, the anode of that triode swings toward negative and the negative swing is extended over conductors 132, 144, capacitor 147 and resistors 148 and 149 to the grid of the right-hand triode section of tube V4. The function of this triode is to reset any transistor flip-flop circuit that was triggered to its off normal condition at the end of reception of the preceding code combination. The negative swing of the right-hand anode of tube V1 produces a negative swing of the right-hand grid of tube V4 reducing conductivity of that triode. As previously stated the cathode of the right-hand triode of tube V4 is connected over conductors 617 and 616, through crystal diode 614 to the emitter electrode 609 of transistor 604. The emitter electrodes of all others of the transistors are connected through individual crystal diodes through conductor 617. Since the right-hand cathode of tube V4 follows the grid toward negative, the emitter of any transistor flip-flop circuit that is off normal will be driven toward negative to restore the flip-flop circuit to its normal condition. A capacitor 151 is coupled from the junction of resistors 148 and 149 to ground, and its function is to delay slightly the negative going transition of the grid and cathode of the right-hand triode of tube V4. It should be remembered that the restoration of tube V1 to normal condition occurs substantially at the same instant that the transfer of the discharge in one of the stepping tubes to a final cathode occurs. Referring specifically to the case under consideration the transfer of the discharge to the final cathode R of tube 202 and the pulsing of capacitor 619, charged by transistor 604, would occur substantially at that instant. If the restoration of the transistor flip-flop circuit to a normal condition were to occur at the same instant, capacitor 619 might discharge to a sufficient extent that the pulse supplied over conductor 621 would be insufficient to activate tube V7 and trigger tube V8. By restoring an off normal transistor flip-flop circuit after the associated capacitor has been pulsed, the charge on the capacitor will not be lost. It will also be remembered that the triggering of a transistor flip-flop circuit in response to a received code combination does not occur at the time of the transfer of the discharge to the final cathode representing that code combination, at substantially the midpoint of the last code element of the code combination, but occurs instead at the resetting of the discharge in the stepping tube during the start element of the next received code combination. Thus, the sequence of events, when the last code element of the code combination has been identified, is to pulse the capacitor of a combiner circuit associated with a transistor flip-flop circuit that was triggered during the start element of that code combination as a result of a selection made in response to the preceding code combination, then to restore that transistor flip-flop circuit, and in the start element of the next code combination to trigger the transistor flip-flop circuit representing the code combination just completed.

It will be noted with reference to FIG. 2 that there is no connection from the final cathode R of tube 202 to a single transistor flip-flop circuit. The significance of this is that among the teletypewriter stations controlled by the decoding circuits contained in FIGS. 2 and 4, there is none having the letter R as the first character of its address code. If there was a station so designated, a single transistor flip-flop circuit would be connected to the final cathode R, and that trigger circuit would be triggered off normal upon the resetting of the discharge in tube 202 during the start element of the code combination following the address code BR, which is a Letters code combination. That single transistor flip-flop circuit would be restored to normal after the middle of the last selecting element of the letters signal. Thus the Letters signal is not used as the first character of any two character code so that there is no connection from the final cathode representing the letters signal to a single transistor flip-flop circuit. From this it follows that at the end of the letters signal none of the single transistor flip-flop circuits is off normal.

Figure 6:
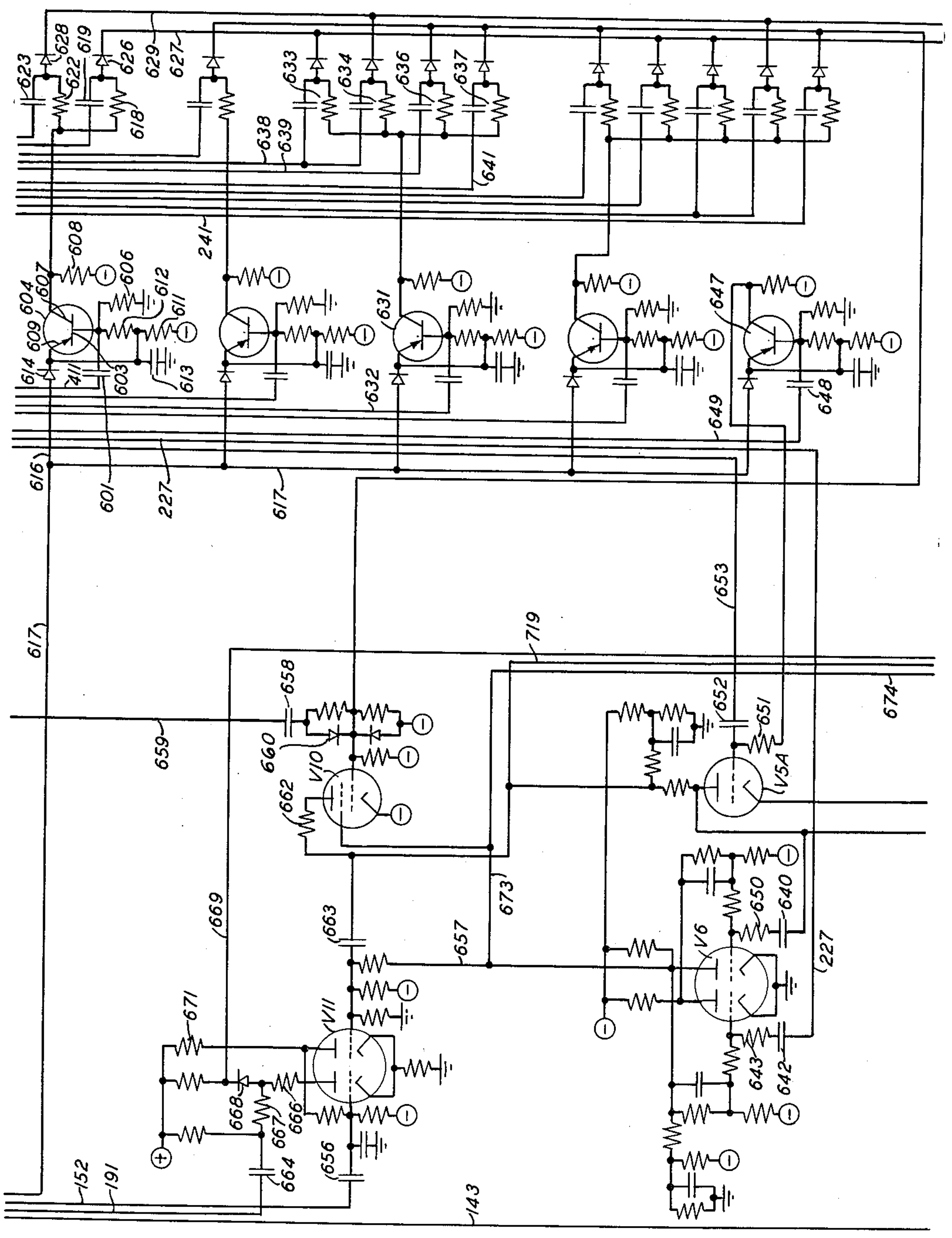

If a message is addressed to more than one station served by the same station selector unit or circuit, the address code for the stations addressed, each comprising a two character address code followed by the Letters signal, will be received by relay 107. For example, the address code BY might be received. The transistor flip-flop circuit 604 will be triggered off normal in response to the character B to prime the combiner circuit comprising resistor 622 and capacitor 623, and the capacitor will be pulsed in response to the signal representing the character Y, delivering a pulse through crystal diode 628 and over conductor 629 to activate momentarily the tube V7A which, along with the bistable flip-flop circuit comprising tube V8A, controls tube V9A, and renders teletypewriter station 716 responsive to signals. The address codes might include a group code, such as code GX. A flip-flop circuit including transistor 631 is arranged to be triggered off normal over conductor 632 which is connected to final cathode G in tube 202. In FIG. 6, the transistor 631 is arranged to prime four combiner circuits 633, 634, 636, and 637. The capacitors in combiner circuits 633 and 634 are connected over conductor 638 to be pulsed when a discharge reaches the final cathode X of tube 402 in response to the code combination for the character X. These two combiner circuits, upon being pulsed, extend the pulse to conductors 627 and 629, thereby selecting both of the stations 713 and 716 to receive a message. In this way, a message may be routed to two or more stations in response to an address code jointly designating them. The other two combiner circuits that are primed by transistor 631 are not pulsed in response to the character X, because their capacitors have other connections. Specifically, combiner circuit 636 has its capacitor connected to conductor 639 and it becomes conductive when a discharge transfers to final cathode A of tube 401, the combiner circuit 636 combining the codes G and A; and the capacitor associated with combiner circuits 637 is connected over conductor 641 to the resistive path associated with final cathode J in the same stepping tube, therefore combiner circuit 637 combines the codes G and J.

The last of the address codes is followed by the Carriage Return and Line Feed signals which are effective, in the teletypewriters that have been selected to receive the message, to advance the stationery in the teletypewriter to the point of beginning of a new line for the recording of the message to follow.

The Carriage Return signal is the deactivate signal, and there is a connection to the final cathode CR in stepping tube 202 which extends over conductor 227, capacitor 642 and resistance 643 to the left-hand grid of tube V6. Tube V6 has connections establishing a bistable flip-flop circuit. Tube V6 together with tube V5A, comprises an activate-deactivate circuit by means of which the Carriage Return signal, received following the selection of stations in response to address codes, deactivates the station selector mechanism so that stations cannot be selected in response to character sequenches appearing in the text of a message that correspond to the address codes of those stations. The end-of-message signal FIGS. H is subsequently effective upon the circuit comprising tubes V6 and V5A to activate the station selector circuit so that it will effect selection of stations in response to address codes of the next message which follow the activate signal Fig. H. In the activate condition, the left-hand triode of tube V6 is conducting, and the right-hand triode is cut off. This causes the positive potential of the nonconductive right-hand anode of tube V6 to be applied over conductors 673 and 674 to the screen grids of tubes V7 and V7A. Earlier in this description it was assumed that these tubes had proper screen voltage for their operation. That screen voltage is obtained from tube V6.

Since the left-hand triode of tube V6 is conducting in the activated condition, the negative pulse applied to its grid from final cathode CR over conductor 227, in response to receipt to the deactivate signal consisting of the character Carriage Return, when a discharge is transferred to that cathode in tube 202 will cut off that triode. When the discharge is reset in tube 202 about the middle of the start element of the next received code combination, tube V6 will reset to its original stable or deactivated condition. In the deactivated condition no two letter combination has any effect on either the station receiving circuit of tubes V7, V8 and V9 or the non-valid code recognizing circuit of tubes V10 and V11 to be described hereinafter. The flip-flop connections of tube V6 cause the right-hand triode to become conductive and the anode swings toward negative, removing the positive screen voltage from tubes V7 and V7A, applied over conductors 673 and 674, and thereby rendering those tubes insensitive to control by their control grids. During reception of the message, the stepping tubes continue to decode received code combinations, stepping discharges to their final cathodes selectively, triggering associated single transistor flip-flop circuits, and pulsing tubes V7 and V7A and corresponding tubes when sequences of two code combinations correspond to address codes in response to which those tubes are to be pulsed. The pulsing of the control grids of the tubes is ineffective because of removal of the screen voltage, and those unselected stations cannot be inadvertently selected.

The activate signal consists of the characters FIGS. followed by H, and precedes the address codes of a message. A special combiner circuit comprising resistor 651 and capacitor 652 is connected to the input of the multivibrator triggering amplifier stage of tube V5A. Each time that a FIGS. code combination is received, a single transistor flip-flop circuit including transistor 647 is triggered, during the start element of the next code combination, by a negative pulse impressed through capacitor 648 from conductor 649 which is connected to the final cathode FIGS. in tube 401. This single transistor flip-flop circuit upon being triggered, primes a code combiner circuit comprising resistor 651 and capacitor 652 associated with the grid of tube V5A, capacitor 652 being connected over conductor 653 to the final H cathode of tube 201. The only circumstance under which the H code combination properly follows the FIGS. code combination is the end-of-message or disconnect signal. Accordingly, any occurrence of the FIG. signal in the text of the message will merely result in the priming of the combiner circuit associated with the grid of tube V5A, and in response to the next succeeding code combination, transistor 647 will be restored. However, when the H signal follows the FIG. signal, the negative pulse applied from the final cathode H of tube 201 through capacitor 652, which is charged from off-normal transistor circuit 647, will render tube V5A conductive momentarily. The anode of tube V5A, which is connected through capacitor 640 and resistor 650 to the right-hand grid of tube V6, will swing negative momentarily, cutting off the right-hand triode of tube V6 and restoring conductivity to the left-hand triode. With the right-hand triode of tube V6 cut off, the positive screen voltage will be restored to tubes V7 and V7A over conductors 673 and 674, thereby effecting reactivation of the station selecting circuits.

The circuit arrangement in the upper left-hand portion of FIG. 6 provides for the selection of one teletypewriter station to receive a message when an address code preceding that message is faulty and, accordingly, non-valid to select any station associated with the transmission channel. It will be understood that a multistation line may include several selector mechanisms of the type being described herein, each serving a plurality of teletypewriter stations. If a message is transmitted from station 101, preceded by an address code which does not represent any station associated with transmission channel 106, none of the teletypewriter stations associated with the line will be selected in specific response to that address code, and the message would be lost in the absence of the circuit arrangement in the upper left-hand portion of FIG. 6. In order to preclude the possibility of such loss of message, the circuit arrangement is provided and is arranged to route any message that is preceded by a non-valid code to station 713. Upon receipt of the message at that station, an investigation may be made as to the proper addressee of the message, steps may be taken to have the message retransmitted so that it will reach the proper destination.

The circuit arrangement for accomplishing this operates upon the principle that it seeks to select station 713 in response to every address code received by relay 107. This attempt is nullified if the address code represents station 713 or 716, or by other station selectable by the selector mechanism shown in this embodiment, and the attempt is also nullified if the address code represents a station selectable by any other selector mechanism associated with the same transmission channel 106.

The non-valid code recognizing circuit comprises twin triode tube V11, tetrode tube V10 and diode 668. Twin triode tube V11 has circuit connections establishing a bistable flip-flop circuit, not with symmetrical cross connections from anodes to grids, but with a cross connection from the right-hand anode to the left-hand grid, and a common cathode resistor providing feedback whereby two conditions of stability are possible. Tube V11 is normally conductive in the left-hand triode and tube V10 is normally cut off. Each time the reset triode, which is the right-hand triode of tube V4, is pulsed negatively by the character timer twin triode V1 about the middle of the fifth selecting pulse of each received code combination, a negative pulse is applied from conductor 132 over conductors 133 and 152 and capacitor 656 to the left-hand grid of tube V11, seeking to cut off that triode. The left-hand triode of tube V11 cuts off and seeks to render the right-hand triode conductive. There is a connection from the right-hand anode of tube V6 in the deactivate circuit over conductor 657 to the right-hand grid of tube V11. It will be remembered that when the deactivate condition exists, under which station receiving circuits are not to be responsive to sequences of code combination corresponding to address codes, the right-hand triode of tube V6 is conductive and its anode is negative. This negative potential applied to the right-hand grid of tube V11 prevents the transfer of conductivity from the left-hand triode to the right-hand triode of that tube. Accordingly, when the negative pulse applied by triode V1 to conductor 152 and capacitor 656 has been dissipated, the left-hand triode of tube V11 is restored to conductivity since the right-hand triode has not been rendered conductive and will not hold the left-hand triode cut off. When the tube V6 becomes reversed for the activate condition, with the right-hand triode cut off, the right-hand anode of tube V6 is swung toward positive, making the right-hand grid of tube V11 less negative than it is in the deactivate condition, but still sufficiently negative that the right-hand triode of tube V11 will not be rendered conductive except upon the cutting off of the left-hand triode of that tube.

It will be assumed that the activate-deactivate circuit has just been placed in the activate condition in response to the Fig. H code combination of the end-of-message signal, thereby removing the disabling potential on the right-hand grid of tube V11. The signal that normally follows the H signal is a Letters signal. About the middle of the fifth selecting element of that signal, the character timer circuit restores and applies a negative pulse through condenser 656 to the left-hand grid of tube V11, seeking to cut off the left-hand triode of that tube. At substantially the same time the discharge in tube 401 transfers to the final cathode Letters, swinging towards positive conductor 417 which extends to conductor 659 and thereover to one terminal of capacitor 658, the other terminal of capacitor 658 being connected through diode 660 to the control grid of tube V10. A positive pulse is thus applied through capacitor 658 to the grid of tube V10 rendering that tube conductive momentarily. The anode of tube V10, which swings negative as the tube conducts, is connected through resistor 662 and capacitor 663 to the right-hand grid of tube V11. The negative swing of the anode of tube V10 is also pressed upon the right-hand grid of tube V11 and precludes the activation of the right-hand triode of tube V11 while the left-hand triode is cut off. When the negative pulse applied through capacitor 656 to the left-hand grid has been dissipated, the left-hand triode returns to conductivity. Thus tube V11 cannot be reversed in response to any received Letters signal because the negative pulse applied to the right-hand grid dominates the tube.

It will now be assumed that the code combination BR for selecting teletypewriter station 713 is received following the Letters signal. The operations resulting from reception of this code combination have been fully described, and they include the momentary pulsing of the control grid of tube V7 from the combiner circuit comprising resistor 618, and capacitor 619. As the anode of tube V7 swings negative, it applies a negative pulse through resistor 718, over conductors 719, through capacitor 663, to the right-hand grid of tube V11. This occurs in response to the signal for the character R of the address code BR. At the time of reception of the code combination for the character B, there is no disabling pulse applied to the right-hand grid of tube V11, because the right-hand triode of tube V11 can be disabled only through conductor 657, 719, or resistor 662. Accordingly, when capacitor 656 is pulsed negatively at the middle of the fifth selecting element of the code combination for the character B, the left-hand triode of tube V11 cuts off and renders the right-hand triode conductive. This registers the reception of a code combination other than the Letters signal. With the left-hand triode of tube V11 cut off, the anode swings toward positive, but the swing is retarded somewhat by capacitor 664 connected to the left-hand anode. The anode load circuit for the left-hand triode of tube V11 includes resistors 666 and 667. From the junction of these two resistors there is a connection to the anode of crystal diode 668, the cathode of which is connected to conductor 669 and to positive battery. Before the cutting off of the left-hand triode of tube V11, the anode of diode 668 is negative relative to the cathode, thereby to bias the diode against transmission of positive pulses not exceeding the amount of the bias.

As hereinabove described, the character R, if part of a two-letter valid code combination, when received will cause conduction in tube V7 and a negative pulse will be applied through resistor 718 and over conductor 719 and through capacitor 663 to the grid of the right-hand triode of tube V11 thereby cutting that triode off and returning tube V11 to its original stable state with the left-hand triode conducting. Similarly, if the valid code combination were for station 716 tube V7A would be rendered conductive and a negative pulse would be applied over conductor 719 to the right-hand grid of tube V11 and the identical result would obtain. Accordingly if the two-letter code combination is valid the pulse is applied to the grid of tube V10 or tubes V7 or V7A and passed to tube V11 through capacitor 663. This action retriggers tube V11 to its orginal stable state with the left-hand triode conducting, and the left-hand plate voltage will fall rapidly below the point where diode 668 cuts off due to the drop across the resistors in the diode circuit, and the condenser voltage on condenser 664 decays rapidly to its steady state condition as a result of the short-circuiting effect of the conducting left triode. In this manner recognition of a valid code prevents diode 668 from transferring recurring positive pulses to conductor 669 which would effect conduction in tube V7 and the connection of receiving station 713 to the line.

Figure 7:
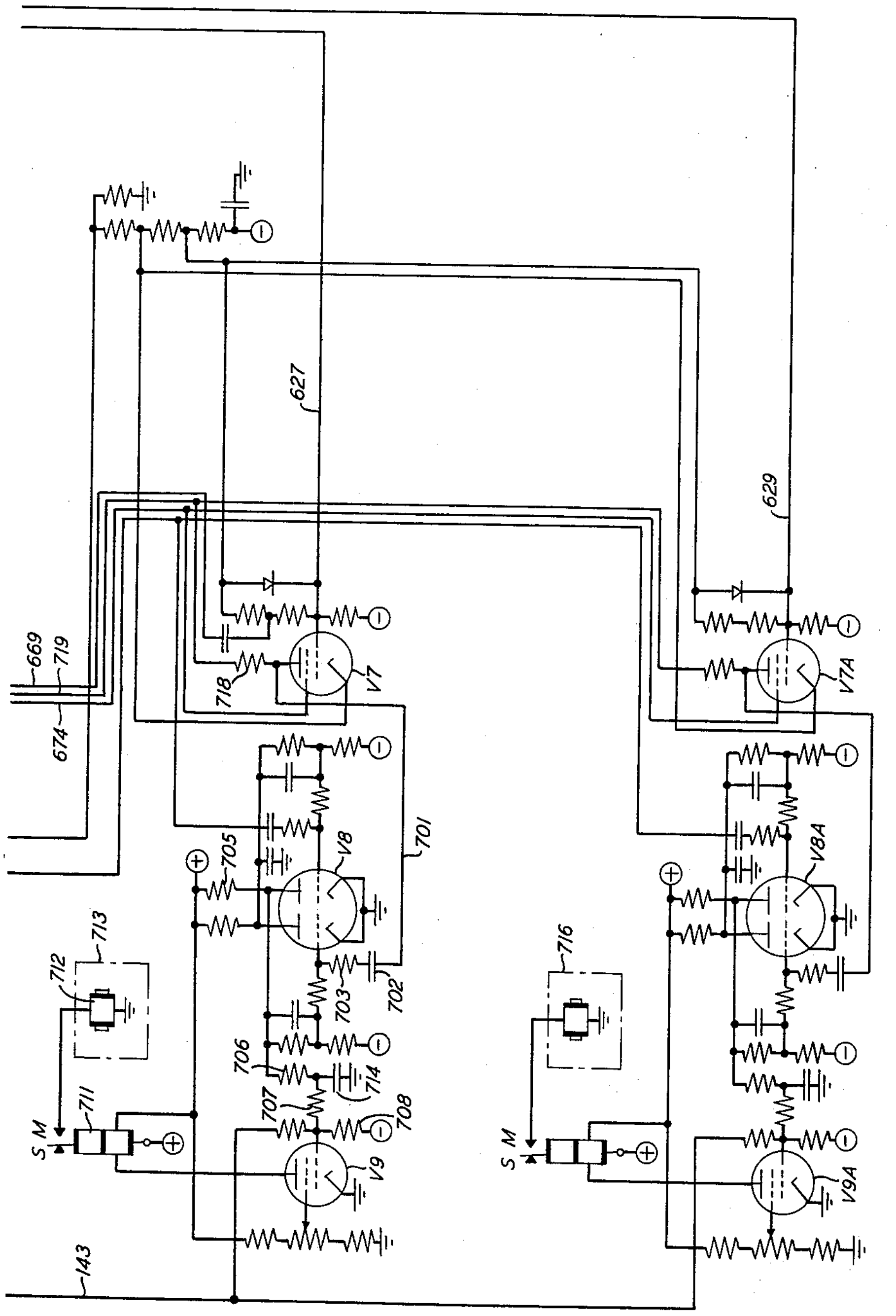

In the event the two-letter combination was invalid and the character B was an incorrect character for a particular station on the line, no pulse is applied to the grids of tubes V10 or V7 or V7A, therefore, tube V11 remains in its unstable condition with the right-hand triode thereof conducting. As hereinabove described the right-hand triode of tube V4 serves two purposes, its cathode circuit being a low impedance source of voltage for the transistor circuit capable of being interrupted to reset the transistor circuit to the normal state and its plate circuit is a source of impulses which occur once per character by the flip-flop action of tube V4. As the right-hand triode of V4 is cut off after the instant of code recognition a positive pulse appears at the right-hand plate of tube V4 and is connected to junction point 111 over conductor 191 through capacitor 664 and resistor 667 to the cathode of diode 668. This delayed pulse from the right-hand triode of tube V4 is now capable of overcoming the bias on diode 668 inasmuch as the left-hand plate voltage of tube V11 remains highly positive. Diode 668 will conduct and a positive output pulse will appear on lead 669 and be applied to the control grid of tube V7 thereby to cause conduction in tube V7. The effect of the positive pulse incoming over conductor 669 on the station receiving circuit of FIG. 7 is similar to the effect on that circuit of a valid code as hereinabove described. Following the receipt of the two-letter invalid combination, the character Letters is received which resets tube V11 as hereinabove described. When the deactive signal Carriage Return is received tube V11 is momentarily triggered and then disabled entirely at the beginning of the next character as the left grid voltage is carried far below cut off by the left plate of tube V6, as described hereinabove.

In the manner described hereinabove, all misdirected messages are routed to a single station where the operating personnel will undertake to ascertain the proper designation of the message and attend to the retransmission of the message with the proper address code. Accordingly, only one of the selector mechanisms associated with a multistation line need be provided with a valid code recognizing circuit comprising tubes V10, V11 and diode 668 and the circuit components associated with them.

Figure 3:
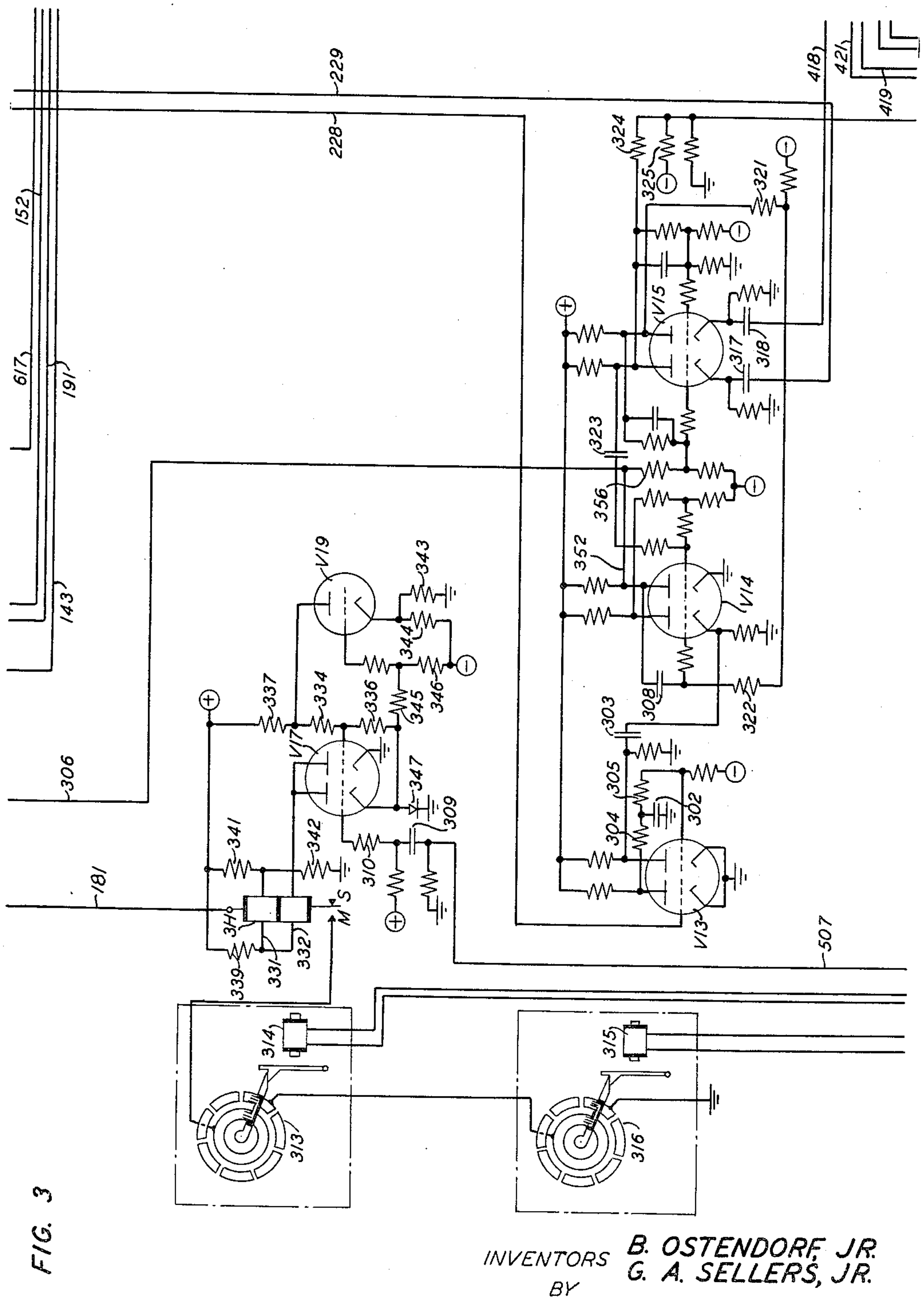
Figure 5:
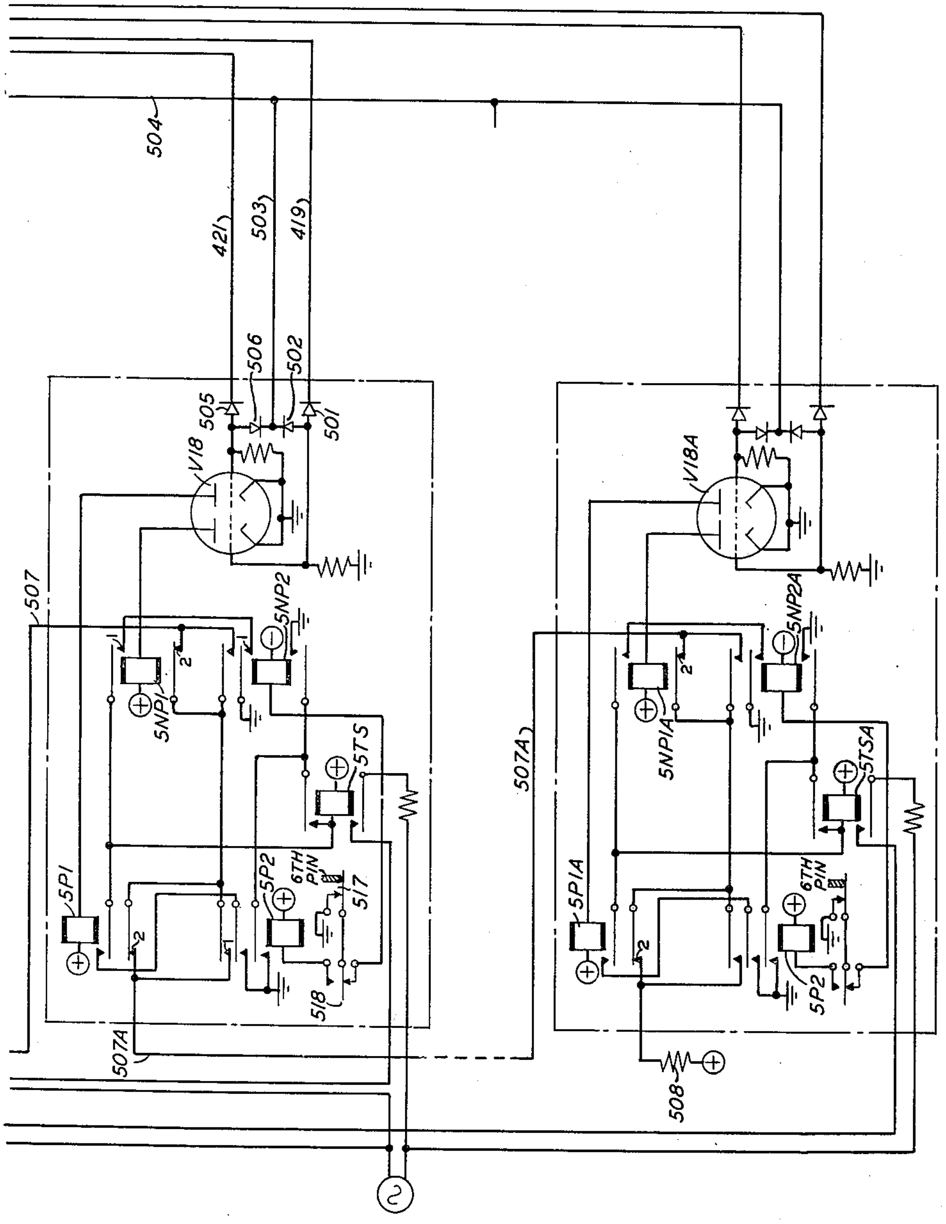

The arrangement for starting a transmitter in response to a roll call is shown in FIGS. 3 and 5. A tape transmitter that is to be started in response to transmitter start signals from station 101 is designated by reference numeral 313, and it may be a conventional tape transmitter controlled by clutch magnet 314. Tape transmitter 313 corresponds to receiving station 713 and tape transmitter 316 corresponds to receiving station 716 to illustrate the sending and receiving circuits at two particular stations. The circuits of clutch magnet 314 corresponding to tape transmitter 313 and clutch magnet 315 corresponding to tape transmitter 316, are closable by transmitter start relays 5TS and 5TSA, respectively. Relay 5TS is operable upon completion of its operating circuit over either of two paths. The closure of one path is controlled by the nonpriority relay 5NP2 and the other path closure is controlled by the priority relay 5P2. Common to the operating paths of these latter two relays are the contacts 517 that are usually designated as six-pin contacts, and these contacts close when a perforated tape containing message material to be transmitted is placed in the tape transmitter, as is shown in FIG. 5. Also common to the operating paths of relays 5NP2 and 5P2 is the swinger of switch or key 518, which is manually operable to connect ground to the operating path of relay 5NP2 or relay 5P2. The key 518 is positionable in one or another of two positions depending upon the degree of urgency of the message, which has been described in the Bacon-Branson-Knandel-Locke application as priority or nonpriority rating, corresponding respectively to relay 5P2 or 5NP2. As disclosed in that application, one transmitter start code may be assigned to a transmitter for priority message pick up and another may be assigned to the same transmitter for nonpriority message pick up. The circuit which originates transmitter start signals invariably first transmits a roll call of priority transmitter start codes in a cycle of operation, and transmits nonpriority transmitter start signals only if it makes a complete roll call of transmitters for priority message traffic without finding any such traffic awaiting transmission. It will be assumed that tape has been placed in transmitter 313, causing the closure of six-pin contacts 517 and that key 518 has been closed to the bottom contact as shown, which will be presumed to be the nonpriority condition. This completes an energizing path for the nonpriority relay 5NP2 which operates. An energizing path for relay 5TS will now be complete from ground through the No. 1 contact of operated relay 5NP2 when relay 5NP1 is operated to close its associated contact 1 to the winding of relay 5TS. The transmitter 313 will be started in due course automatically, and in response to its assigned nonpriority roll call signal without further supervisory attention, as will now be described.

It will be presumed that station 713 is receiving a message, and that before the completion of the message a Blank signal is recieved from station 101. This signal has all of its selecting elements of spacing nature. At the time of reception of the Blank code combination, the selector mechanism is unable to determine whether the Blank signal is the beginning of a transmitter start pattern or whether the signal was included in the message transmitted from station 101. In either case, the selector mechanism decodes the signal, and the decoding operation results in the transfer of a discharge to the final cathode Blank in stepping tube 201. The potential of that cathode swings toward positive, correspondingly extending a positive voltage swing over conductor 228 to the grid of the left-hand triode of tube V13 in FIG. 3. Tube V13 comprises a delay-amplifier circuit with the left-hand triode thereof normally nonconducting. The excursion of the left-hand grid towards positive causes the left-hand triode to swing from cut off to full-on condition and its anode accordingly swings toward negative. This plate voltage transition is delayed approximately 250 milliseconds by the delay circuitry comprising resistors 304 and capacitor 302 and then is coupled to the right-hand grid of tube V13. This delayed negative voltage swing applied to the right-hand grid of tube V13 forces the right-hand triode thereof to cut off and a positive voltage swing to appear on the right-hand plate thereof. Accordingly, the delayed negative swing of the right-hand grid of tube V13 is accompanied by positive swing of the anode as conductivity in the tube is reduced and a positive pulse is applied through capacitor 303 to the cathode of the left-hand triode of tube V14. It will be apparent from the foregoing that the right-hand triode of tube V13 does not undergo a substantial reduction in conductivity until after the delay interval determined by the time constants of resistor 304 and capacitor 302.

The double triode V14 is a one-shot multivibrator having a temporarily stable period of 1½ seconds. In the idle condition the left-hand triode is conducting and the right-hand triode is cut off. Thus, the positive pulse applied through capacitor 303 to the left-hand cathode of tube V11 is the equivalent of a negative pulse on the left-hand grid so that the left-hand triode of tube V14 cuts off, its anode swinging toward positive. The left-hand anode of tube V14 is connected through a potential divider circuit to the grid of the right-hand triode, and with the left-hand triode cut off, the right-hand triode is rendered conductive, its anode swinging toward negative. The right-hand anode of tube V14 is connected over conductors 352 and 306 to the grid of tube V5, and with the right-hand triode of tube V14 conductive and while that triode remains conductive, tube V5 is rendered unresponsive to signals repeated by relay 107. This represents a blinding of teletypewriter 713 that has been receiving a message repeated over conductor 143 from the output of tube V5, so that it will not respond to the transmitter start codes that may be expected to be received after a pause of a duration sufficient to cause the cutting off of the right-hand triode of tube V13 and the pulsing of the left-hand cathode of tube V14.

Before proceeding with a description of operations resulting from reception of a proper transmitter start pattern, consideration will be given to the condition that results when the Blank signal is merely another signal in the message text and is not followed by pause of the proper duration. It will be remembered that the discharge is transferred from a final cathode of any of the stepping tubes to the reset cathode during reception of the start element of the next code combination. If the Blank signal, which causes the left-hand triode of tube V11 to be conductive, is followed almost immediately by another and different code combination, the discharge will be transferred from the final cathode Blank of tube 201 to the reset cathode. This will cause the left-hand triode of tube V13 to be cut off before capacitor 302 has timed out and cut off the right-hand triode of the tube. It follows from this that only in response to a rest or pause of a predetermined minimum duration, usually of the order of one second, will teletypewriter receiving circuits be blinded and the other preparations be made for the reception of the transmitter start code.

Tube V14 has its two triode sections connected as a one-shot multivibrator having a temporarily stable period of 1.5 seconds. Prior to the pulsing of the left-hand grid through capacitor 303, the left-hand triode is conductive and the right-hand triode is cut off. When the tube V14 reverses and the right-hand triode becomes conductive, its anode applies a negative pulse via coupling capacitor 308 to the left-hand grid to hold the left-hand triode cut off for an interval. There is also a connection from the right-hand anode of tube V14 via resistor 356 to the grid of the left-hand triode of tube V15. Tube V15 has cross-connections between its anodes and control grids, establishing a bistable flip-flop circuit, and the left-hand triode is normally conductive. The negative-going swing applied to the left-hand grid of tube V15 from the right-hand anode of tube V14 is preparatory, reducing somewhat the conductivity, but being insufficient to cut off the left-hand triode or cause the right-hand triode of tube V15 to become conductive.

The timed pause following the transmission of the Blank signal from station 101 is ended by the transmission of a Space code combination, and the circuit that controls the transmission of the transmitter start pattern transmits the latter signal before tube V14 times out and restores itself to the initial condition. The space code combination results in the transfer of a discharge to final cathode SP in stepping tube 201, swinging that cathode toward positive. The positive voltage swing is applied over conductor 229 and capacitor 317 to the left-hand cathode of tube V15. The positive swing of the cathode has the same effect as a further negative swing of the grid would have, and is sufficient to cut off the left-hand triode, thereby causing the right-hand triode of tube V15 to become conductive. The right-hand anode swings toward negative, and this negative potential is applied to the left-hand grid of tube V15 to hold the left-hand triode cut off. There is also a connection from the right-hand anode of tube V15 through resistors 321 and 322 to the left-hand grid of tube V14 to hold that grid negative and the left-hand triode cut off as long as tube V15 remains off normal even though tube V14, which is otherwise monostable, should time out and seek to restore itself to initial condition. Tubes V14 and V15 remain in the off-normal condition throughout the roll call of transmitters and until the reception by relay 107 of a Letters signal, which indicates that a transmitter has been started or that a full roll call has been made without finding a transmitter having material awaiting transmission. The Letters signal is decoded, and results in the transfer of a discharge to final cathode Letters of tube 401. This causes a positive voltage swing to be applied over conductors 417, 418 and capacitor 318 to the cathode of the right-hand triode of tube V15. The positive swing of this cathode, having the same effect as a negative swing of the grid, causes the cutting off of the right-hand triode, which in turn causes restoration of conductivity in the left-hand triode thereof. With the right-hand triode of tube V15 cut off, the lock on tube V14, applied to the left-hand grid, is removed. At the same time the negative swing of the left-hand anode of tube V15, as the left-hand triode becomes conductive, is impressed through capacitor 323 on the right-hand grid of tube V14. That right-hand triode of tube V14 will be cut off, applying a positive pulse through capacitor 308 to the left-hand grid of tube V14 thereby to restore conductivity to the left-hand triode thereof. The forceable cutting off of the right-hand triode of tube V14 through capacitor 323 operates as a quick reset arrangement to restore tube V14 to normal condition even though the tube may not have timed out to its self-restoring condition. The restoration of tube V14 results in the re-establishment on the grid of tube V5 of the potential that will enable it to follow signals repeated by relay 107, assuming that station 713 had been receiving a message when the transmission of transmitter start signals was begun. The unblocking of tube V5 represents unblinding of the receiving station.

Prior to reception of the Letters signal, one or more signal character code combinations, each representing the call signal of a transmitter, are received. It will be assumed that one of the code combinations received represents the character Y and results in the transfer of a discharge to the final cathode Y of tube 402. The potential of this cathode swings toward positive and the raised potential is extended over conductor 419 to the cathode of crystal diode 501, the anode of which is connected to the grid of the left-hand triode of tube V18. Prior to reception of the Space signal, a potential divider system connected to the cathode of crystal diode 502, including the left-hand triode of tube V15, which is then conductive and has its anode connected through resistor 324 and over conductors 504 and 503 to the cathode of crystal diode 502, and also including resistor 325 connecting negative battery to the cathode of crystal diode 502, maintains the left-hand grid of tube V18 sufficiently negative to hold the left-hand triode thereof cut off. Upon the reversal of tube V15 in response to the Space signal and the raising of the potential of the left-hand anode to a more positive value, the grid of the left-hand triode of V18 becomes less negative, but the tube is still cut off. The positive swing applied to the cathode of crystal diode 501 from the Y cathode of decoder tube 402 makes the grid of the left-hand triode of tube V18 still less negative, and that triode conducts.

The anode circuit of the left-hand triode of tube V18 includes the winding of relay 5NP1 which operates. At the armature and contact 1 of relay 5NP1 an energizing circuit for the transmitter start relay 5TS is complete, this circuit being traced from ground through the armature and No. 1 contact of operated relay 5NP2, through the armature and No. 1 contact of operated relay 5NP1, and through the winding of relay 5TS to positive battery. Relay 5TS locks to ground through the armature and bottom contact of operated relay 5NP2. The armature and bottom contact of operated relay 5TS complete the operating path for clutch magnet 314 which initiates transmission from tape transmitter 313.

As is fully disclosed in the Bacon-Branson-Knandel-Locke application, the reception of transmission from a transmitter that is started in response to the roll call signal results in the transmission by the transmitter start circuit of the Letters signal, which is indicative of the end of the roll call, and is effective when received by relay 107 to unblind any receivers that have been blinded against response to the transmitter start codes. This unblinding as applied to station 713, has been described previously, and is necessary in order that those receivers may be conditioned to resume message reception. The resetting of the discharge in tube 402 during the start element preceding the Letters signal results in the removal of the positive potential from the cathode of crystal diode 501 and the cutting off of the left-hand triode of tube V18, thereby releasing relay 5NP1. Since relay 5TS locked in the operated condition, there is no further need for relay 5NP1 to remain operated. When transmission of the message from transmitter 313 is completed and the message tape runs out, the six-pin contact 517 opens, unlocking relay 5NP2, which releases distributor clutch magnet 314 to suspend outgoing transmission.

In any roll call of transmitters, the priority transmitter start codes are transmitted before the non-priority roll call, the latter roll call occurring only if no transmitter has been conditioned for priority transmission. The priority code for transmitter 313 is the code combination for the character F. Accordingly, this code combination is transmitted among other priority start codes preceding the transmission of the code for the character Y, and when it is decoded the discharge in tube 402 transfers to final cathode F, swinging towards positive the conductor 421 which is connected to the cathode of crystal diode 505. This diode has its anode connected to the grid of the right-hand triode of tube V18 and has also associated with that grid a crystal diode 506 which has its cathode connected to the same potential divider network as the crystal diode 502. Accordingly, the preparatory enabling voltage is supplied to the right-hand grid of tube V18 at the same time as the application of the enabling voltage to the left-hand triode when tube V15 is triggered. It follows that the right-hand triode of tube V18 becomes conductive in response to the code for the character F and operates priority transmitter start relay 5P1. Relays 5P1 and 5P2 perform the same function as relays 5NP1 and 5NP2 respectively, that is to energize transmitter clutch magnet 314, to start transmission from transmitter 313.

As disclosed in the Bacon-Branson-Knandel-Locke application, the transmission of successive transmitter start codes of a roll call is dependent upon a response from each of the called transmitters. When the transmitter responds with message transmission, the reception of that transmission at the control station 101 serves to end the roll call with the transmission of the Letters signal. When a transmitter is not conditioned to transmit a message the code combination for the letter H is automatically generated and transmitted to the control station and the reception of that code combination at the control station results in reactivation of the transmitter start circuit for the transmission of a next transmitter start code in the roll call.

The present invention includes an arrangement for generating and transmitting an H signal when a transmitter is not conditioned to transmit, and the generation of the H signal will now be described with relation to FIG. 3.

For the purpose of initiating the generation of the H signal, relays 5NP1 and 5P1 are arranged to connect positive battery through their armatures and No. 2 contacts, through exactly similar relay circuit configurations associated with other transmitters, through resistor 508 to conductor 507 which extends to one terminal of capacitor 309, the other terminal of which is connected through resistor 310 to the grid of the left-hand triode of tube V17. When the transmitter code amplifier V18 conducts in its right-hand triode, relay 5P1 operates as long as decoder tube 402 is not reset. If relay 5P2 has not been previously operated, break contacts 2 of relay 5P1 will remove positive battery from lead 507 which will, as explained hereinafter, cause generation of an artificial letter H for transmission to the switching office, thereby to indicate that the particular station has no priority business. If there is priority business, relay 5P2 would have been operated by way of key 518 and closure of six-pin contact 517, and lead 507 would not be opened due to closure of contact 1 of relay 5P2 which short circuits the open contact 2 of relay 5P1. Contacts of relays 5NP1 and 5NP2 are similarly connected in the operating circuit of conductor 507 and the identical result would obtain if there was nonpriority traffic awaiting transmission.

When lead 507 is opened by the absence of traffic at station 313 as hereinabove described, the voltage on the lower plate of condenser 309 changes from approximately 260 volts positive to zero, as positive battery normally applied through resistor 508 to conductor 507 is removed. The top plate of condenser 309 is thus driven negative by over 200 volts. This negative potential is applied to the left-hand grid of tube V17 via resistor 310 and a negative transition is impressed on the grids of the right-hand triode of tube V17 and triode V19 by the cathode follower action of the left-hand triode of tube V17. This negative voltage holds the right-hand triode of tube V17 and triode V19 in the cut-off condition.

The top plate of condenser 309 begins to change positively at an exponential rate due to the positive battery applied thereto. The grid and the cathode of the left-hand triode of tube V17, by follower action, also begins a positive exponential transition. Thus, the grids of the right-hand triode of tube V17 and triode V19 become more positive and less negative corresponding to the positive exponential charging of condenser 309. The point at which a particular grid of the triodes of tubes V17 and V19 becomes sufficiently positive to cause conduction depends on the characteristics and parameters of the particular grid circuits and the exponential wave applied thereto. The first triode to conduct as a result of the positive transition is the right-hand section of tube V17 and the time of this conduction is determined by the relative values of resistors 334, 336, and 337. The time lapse between the opening of conductor 507 and conduction in the right-hand triode of tube V17 is equal to the transmission time of three teletypewriter code signal elements.

The armature and marking contact of the no-traffic relay 3H is in the circuit of transmission channel 181 and distributors 313 and 314 and the operation thereof will control the code transmitted to station 101. A biasing winding 331 tends to urge the armature of relay 3H to its spacing contact by current flow therein, over a circuit extending from positive battery through resistor 339 and winding 331 to the midpoint of resistors 341 and 342 which comprises a low impedance potentiometer. When one of the triodes of tube V17 conducts, the current through operating winding 332 causes relay 3H to go marking and reduces the potential across winding 331 by the drop through resistor 339 to a point whereby negligible current flows therein. Thus, when neither triode of tube V17 is conducting, the armature of relay 3H goes to the spacing contact and a spacing signal is transmitted; and when either of the triodes of tube V17 is conducting the armature of relay 3H goes to the marking contact and a marking signal element is transmitted over the line.

The signaling code of the permutation character H comprises the following teletypewriter code signal elements; a spacing start impulse, a first and second spacing selecting impulse, a third marking selecting impulse, a fourth spacing selecting impulse, a fifth marking selecting pulse and a marking stop pulse.

Accordingly, when conductor 507 is opened and tubes V17 and V19 are cut off, a spacing condition is sent to line 181 due to the current flow in biasing winding 331. This spacing condition is impressed on the line 181 for a period of time equal to the transmission of time of three spacing permutation code elements comprising the start element and two selecting elements of a teletypewriter code, and determined by the circuit parameters of the grid circuit of the right-hand triode of tube V17. At the end of the second selecting spacing element after the spacing start element, the positive transition of the grid of the right-hand triode of tube V17 is sufficient to effect conduction in that triode. Conduction in triode V17 completes a circuit through operating winding 332 and relay 3H operates to its marking contact and a marking condition is impressed on the line 181 as the third selecting element of the teletypewriter code.

The parameters of the grid circuit of triode V19 comprising resistors 345 and 346 to which the positive transition is applied, and the cathode potentiometer circuit of resistors 343 and 344 are determined so as to delay conduction in triode V19 until the third selecting element is transmitted. At this time triode V19 conducts and the negative transition at its plate is coupled via resistor 334 to the grid of the right-hand triode of tube V17 thereby to cut off this latter triode at the beginning of the fourth selecting element. Current ceases to flow in the plate circuit of the right-hand triode of tube V17, including the operating winding 332 of relay 3H and relay 3H returns to spacing under the control of biasing winding 331 and a spacing fourth selecting element is impressed on the line 181. At the end of the fourth selecting spacing element transmitted, the cathode of the left-hand triode of tube V17, which has been going positive, reaches zero voltage and diode 347 conducts. The grid of the left-hand triode of tube V17 is sufficiently positive at this time to allow conduction in that triode now that its cathode circuit is tied to ground by the conductive condition of diode 347. Current flowing in the plate circuit of the left-hand triode of tube V17 including the operating winding 332 of relay 3H causes the armature of relay 3H to go to its marking contact and a marking fifth selecting element is transmitted to the line followed by a marking stop element to complete the transmission of the permutation code character H.

Station 101 recognizes the character H as a no-traffic response and resumes the transmission of roll call signals to other stations. When a transmitter at another station is started or after a full roll call has been completed, the Letters signal is transmitted by station 101. The Letters signal is decoded and results in the transfer of a discharge to final cathode LTRS of tube 401. This causes a positive voltage swing to be applied over conductor 417, 418 and capacitor 318 to the cathode of right-hand triode of tube V15. The positive swing of this cathode has the same effect as a negative swing of the grid and causes the cutting off of the right-hand triode, which in turn effects restoration of conductivity in the left-hand triode thereof. This reversal in tube V15 causes the potential of the left-hand anode to become less positive which results in the cut off of the operative triode of tube V18, as hereinabove described, and the release of NP1 or P1 and the consequent reclosure of conductor 507 to positive battery, thereby to restore the answer-back signal generating circuit to the normal condition.

Although a specific embodiment of the invention has been shown in the drawings and described in the foregoing specification, it will be understood that the invention is not limited to the specific embodiments but is capable of modification, substitution and rearrangement of parts and elements without departing from the spirit of the invention.

What is claimed is:

1. A telegraph code signal generating circuit having a signal relaying means, a first electron discharge device including a control grid and an output circuit for controlling said signal relaying means, a second electron discharge device including a control grid and an output circuit for controlling said control grid of said first electron discharge device, a third electron discharge device including a control grid and an output circuit for controlling said signal relaying means, a control circuit operably connected with the control grids of said first, second and third electron discharge devices for rendering said devices nonconductive, and exponential discharging means in said control circuit for effecting the timed successive cut on of said first, second and third devices after the cut off thereof.

2. A telegraph code signal generating circuit having a signal transmitting device, a first electron discharge device including a control grid and an output circuit for controlling said signal transmitting device, a second electron discharge device including a control grid and an output circuit for controlling said control grid of said first electron discharge device, a third electron discharge device including a control grid and an output circuit for controlling said signal transmitting device, a control circuit operably connected with the control grids of said first, second and third electron discharge devices for rendering said electron discharge devices nonconductive, timing means in said control circuit for effecting the timed successive cut on of said first and second electron discharge devices, and clamping means controllably connected with said third electron discharge device and responsive to said timing means for causing conduction in said third electron discharge device.

3. A telegraph station selector system having a permutation code signal receiving circuit, a discharge tube having a fan-like array of electrodes of one kind including an electrode representing an apex of said fan-like array and ranks of the electrodes progressively doubling in number in a direction outwardly from said apex electrode, connections from said permutation code signal receiving circuit to said electrodes for causing a selective transfer of a discharge in said tube beginning at said apex electrode and proceeding from rank to rank and to a selected one of the electrodes in each rank in response to the reception of the successive elements of a permutation code signal combination by said receiving circuit and an answer-back circuit for generating a succession of signal elements comprising means responsive to the transfer of a discharge to a predetermined one of said electrodes for generating an exponential pulse and means for producing a permutation of signal elements in response to the exponential change of said pulse generated by said responsive means.

4. In a signal transmitter for generating a succession of signal elements comprising means for generating a unipolar exponential pulse, means including a plurality of non-linear circuit elements successively operated in response to the exponential change of said pulse generated by said generating means and means controlled by said operated circuit elements for producing a succession of irregularly spaced signal transitions.

5. A signal transmitter comprising means for generating a unipolar exponential pulse and means for producing a succession of irregularly spaced signal transitions in response to the exponential change of said pulse generated by said generating means.

6. A signal transmitter comprising means for generating a unipolar exponential pulse, a plurality of nonlinear circuit elements, means responsive to said pulse generated by said generating means for rendering operated selected ones of said circuit elements at respective points on said pulse and means controlled by said operated circuit elements for producing a succession of irregularly spaced signal transitions.

7. A telegraph station selector system having a permutation code signal receiving circuit, a decoding circuit having a plurality of terminals and including means for selectively applying pulses to said terminals in response to code signals received by said receiving circuit and an answerback circuit for generating code signals comprising means responsive to the application of a pulse to one of said terminals for generating an exponential pulse and means for producing a succession of irregularly spaced signal transitions in response to the exponential change of said pulse generated by said generating means.

8. A control circuit having a plurality of terminals comprising, a pair of non-linear circuit elements, voltage pulse generating means, a bilinear circuit element, an internal control path connected between the output terminal of one element and the input terminal of the other element of said pair for causing said other element to be rendered nonconductive by the occurrence of a conductive condition in said one element, an external control path including said bilinear element connected between the output terminal of said voltage pulse generating means and the input terminals of said non-linear circuit elements for applying said voltage pulse thereto, timing means included in said external control path and operable upon application of said voltage pulse to successively render conductive said non-linear elements beginning with said other element, clamp means responsive to said timing means and operable a predetermined interval after application of said voltage pulse to effectively render conductive said bilinear element and a signal relaying device having its input terminal connected to the output terminals of said bilinear element and said other element and operable to interpret as signal transitions the succession of conduction and nonconduction intervals therein and to transmit said signal transitions.

9. In a telegraph signaling system, an answerback circuit comprising a capacitor for generating a unipolar exponential pulse, and means responsive to intermediate conditions of said pulse generated by said capacitor answerback circuit for generating a succession of irregularly spaced signal transitions.

10. In a telegraph signaling system, an answerback circuit comprising a capacitor, means for exponentially charging said capacitor, and means responsive to said exponentially charging capacitor for generating a succession of irregularly spaced signal transitions.

11. A permutation code signal generating circuit comprising a normally conductive electron discharge device, timing means for rendering said normally conductive device nonconductive for an interval, a second electron discharge device, means responsive to said timing means for rendering said second device conductive at a predetermined time in said interval, a third electron discharge device, further means responsive to said timing means for rendering said third device conductive at a later predetermined time in said interval, means responsive to said third conductive device for rendering said second device nonconductive, and signal transmitting means responsive to said normally conductive device and said second device for transmitting signal transitions.

References Cited in the file of this patent

UNITED STATES PATENTS

| | | |
|---|---|---|
| 2,053,787 | Wassell | Sept. 8, 1936 |
| 2,667,533 | Zenner | Jan. 26, 1954 |
| 2,673,331 | Liguori | Mar. 23, 1954 |
| 2,714,705 | Volz | Aug. 2, 1955 |
| 2,732,428 | Dain | Jan. 24, 1956 |
| 2,805,283 | Stiles | Sept. 3, 1957 |
| 2,816,956 | Wheeler | Dec. 17, 1957 |
| 2,822,467 | Washburn | Feb. 4, 1958 |
| 2,848,605 | Kuchinsky | Aug. 17, 1958 |